United States Patent
Watanabe et al.

(10) Patent No.: US 7,310,156 B2
(45) Date of Patent: Dec. 18, 2007

(54) PRINTING SYSTEM, PRINTING METHOD, DIGITAL CAMERA, STORAGE MEDIUM AND PROGRAM FOR PRINTING METHOD, AND PRINTING CONTROL APPARATUS

(75) Inventors: Hitoshi Watanabe, Kanagawa (JP); Takatoshi Suzuki, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1338 days.

(21) Appl. No.: 10/058,749

(22) Filed: Jan. 30, 2002

(65) Prior Publication Data

US 2002/0105669 A1 Aug. 8, 2002

(30) Foreign Application Priority Data

Feb. 1, 2001 (JP) ............... 2001-025950

(51) Int. Cl.
- *G06K 15/00* (2006.01)
- *H04N 1/00* (2006.01)
- *H04N 1/32* (2006.01)

(52) U.S. Cl. ............... 358/1.1; 358/1.3; 358/405; 358/438; 358/439; 358/468

(58) Field of Classification Search ............... 358/400, 358/401, 403, 404, 405, 407, 435, 436, 439, 358/438, 468
See application file for complete search history.

(56) References Cited

U.S. PATENT DOCUMENTS

| | | | | |
|---|---|---|---|---|
| 4,313,124 A | 1/1982 | Hara | ............... | 346/140 R |
| 4,345,262 A | 8/1982 | Shirato et al. | ............... | 346/140 R |
| 4,459,600 A | 7/1984 | Sato et al. | ............... | 346/140 R |
| 4,463,359 A | 7/1984 | Ayata et al. | ............... | 346/1.1 |
| 4,558,333 A | 12/1985 | Sugitani et al. | ............... | 346/140 R |
| 4,723,129 A | 2/1988 | Endo et al. | ............... | 346/1.1 |
| 4,740,796 A | 4/1988 | Endo et al. | ............... | 346/1.1 |
| 5,847,836 A | 12/1998 | Suzuki | ............... | 358/296 |
| 6,580,460 B1 | 6/2003 | Takahashi et al. | ............... | 348/372 |
| 6,819,444 B1* | 11/2004 | Yamagishi | ............... | 358/1.15 |
| 6,963,672 B1 | 11/2005 | Watanabe et al. | ............... | 382/305 |
| 2002/0021320 A1* | 2/2002 | Miyazawa | ............... | 347/19 |
| 2002/0186421 A1* | 12/2002 | Tachibana | ............... | 358/437 |

FOREIGN PATENT DOCUMENTS

EP 0 862 313 A2 9/1998

(Continued)

*Primary Examiner*—Jerome Grant
(74) *Attorney, Agent, or Firm*—Fitzpatrick, Cella, Harper & Scinto

(57) ABSTRACT

Conventionally, when due to running out of a battery or paper the printing designated in advance is not completed and when the interrupted printing is to be resumed, the images from the beginning must be printed, or images to be printed must be selected again using the camera. To resolve this problem, a printing system, which continuously performs printing on a plurality of sheets based on print setting information including, at the least, information for designating an image to be printed, comprises input means for entering image data that are to be printed printing means for printing the image data entered by the input means, storage means for, when printing based on the print setting information is halted, storing interrupt information concerning the printing completed before the interrupt, and control means for employing the interrupt information stored in the storage means to resume printing based on the print setting information.

31 Claims, 16 Drawing Sheets

FOREIGN PATENT DOCUMENTS

| | | |
|---|---|---|
| JP | 59-123670 A | 7/1984 |
| JP | 59-138461 A | 8/1984 |
| JP | 62261470 * | 11/1987 |
| JP | 01069372 A * | 3/1989 |
| JP | 04175057 * | 6/1992 |
| JP | 5-342238 | 12/1993 |
| JP | 06103005 * | 4/1994 |
| JP | 06139031 * | 5/1994 |
| JP | 9-65182 A | 3/1997 |
| JP | 10-149265 | 6/1998 |
| JP | 10-243327 A | 9/1998 |
| JP | 10282856 * | 10/1998 |
| JP | 2000-094781 | 4/2000 |

* cited by examiner

FIG. 16

```
3201 — [HDR]
3202 — GEN DTM=2000:01:01:00:01:41
3203 — [JOB]
3204 — PRT PID=001
3205 — PRT TYP=STD
3206 — PRT QTY=002
3207 — <IMG SRC="../DCIM/853CANON/IMG_5393.JPG">
        [JOB]
        PRT PID=002
        PRT TYP=STD
        PRT QTY=003
        <IMG SRC="../DCIM/856CANON/IMG_5605.JPG">
```

FIG. 17

| |
|---|
| 3301 — FLAG |
| 3302 — DATE AND TIME OF CREATION |
| 3303 — FILE SIZE |
| 3304 — THE NUMBER OF JOBS |
| 3305 — THE NUMBER OF TOTAL PRINTS |
| 3306 — PRINTED NUMBER |

PRINTING SYSTEM, PRINTING METHOD, DIGITAL CAMERA, STORAGE MEDIUM AND PROGRAM FOR PRINTING METHOD, AND PRINTING CONTROL APPARATUS

BACKGROUND OF THE INVENTION

1. Field of the Invention

The present invention relates to a printing system, and relates in particular to a printing system appropriate for outputting, through a computer to a printer, digital data obtained by a digital still camera or a video camera, or for printing such digital data through a recording medium or communication means.

2. Related Background Art

Conventionally, thermal transfer line printers are available that employ thermal recording paper for printing, that selectively drive multiple heat generating elements arranged in the main scanning direction to feed paper in the sub-scanning direction, and that print lines of dots on the paper.

As a consequence of the development of input devices such as digital cameras, digital video cameras or scanners for handling images the focus has been on the use of thermal transfer printers as printing means.

The reason for this is as follows. Because with an ink-jet printer there are only two choices, either ink droplets are ejected or they are not, resolution and the appearance of tone gradation are obtained by depositing small droplets of ink on paper. On the other hand, with a thermal transfer printer, since the value of the available heat can easily be changed for each pixel, many tone gradations can be obtained for one pixel, and when compared with an ink-jet printer, a thermal transfer printer can print a smoother, higher quality image. Further, as the functions of thermal heads and the quality of the printed material they output are improved, images for which the quality of the finish is as good as that of a silver halide photograph can be printed. Therefore, thermal transfer printers have drawn much attention, especially as a natural image printer that can keep step with the recent progress of digital cameras.

Recently, a system has also appeared that provides for one of the above printing apparatuses to be directly connected to an image pickup device, such as a digital camera or a digital video camera, or to be integrally constructed with a device, so that obtained image data can be printed without an apparatus, such as a computer, being required for processing the data. This system, since image data obtained by a digital camera or a digital video camera can be easily printed, like a photograph, it is very convenient.

As an example of this system, the connection of an image input device and an image output device is described in Japanese Application Laid-Open No. 10-243327.

According to this publication, in an image input/output system wherein an image output device and an image input device are connected together, the image output device has a function for receiving an image signal from the image input signal and outputting it, and includes a power source for supplying power to the image input device. The image output device includes: determination means, which is connected to the image output device by a connection cable along which image data is transmitted and power is received from the image output device, and which determines whether the supply of power by the image output device is enabled; and a power source. When the determination means ascertains that the supply of power by the image output device has been enabled, it employs that power. But when the supply of power has not been enabled, the determination means employs the power available from the power source.

According to this system, since power can be received from the image output device, an image can be printed without taking into account the remaining power available in the image input device, such as a digital camera.

Further, in Japanese Patent Application Laid-Open No. 9-65182, a power conservation system for a composite camera is described. According to this publication, the composite camera is designed by integrally forming an image pickup means, which includes a digital viewfinder, for storing video data on a recording medium, and a printing means for printing the video data on recording paper. The composite camera also comprises control means for halting the supply of power to the electronic viewfinder while the printing means is outputting the video data to the recording paper. According to the specifications for this camera, since the supply of power to the electronic viewfinder is halted during printing, an effective power saving configuration is provided.

In addition, since the digital camera is directly connected to the printer, while the printer is using image data acquired by the digital camera for printing, a power supply device, such as an AC adaptor, that is used to supply power to the printer can also be used to supply power to the digital camera when requested. However, in accordance with the recent development of more power efficient semiconductors, the consumption of power can be reduced, so that a battery can be used to operate both the digital camera and the printer, and the two can be employed outdoors as a mobile device.

Furthermore, information concerning the images to be printed, the number of sheets to be printed and the printing method to be used can be set in advance in the digital camera, so that once printing is started, multiple types of images that have been designated in advance can be automatically produced.

However, a problem has arisen in that when the digital camera and the printer are employed as mobile devices, especially when it is necessary for a large number of sheets to be printed, the battery power is soon exhausted and the printing is halted.

Further, as another problem, due to a shortage of paper the printing process may be interrupted before the previously designated printing has been completed.

In both these cases, when resuming printing, the process must be begun again at the beginning, or the setup procedure for the printing must be repeated.

As a result, since each time a continuous printing process is interrupted the printing must be resumed at the beginning, not only is paper and ink wasted, but also time.

In addition, a certain amount of labor is required to select only those images that have not yet been printed or to repeat the printing setup procedure, and there is always a chance that an error may be made in the selection of the images or in the designation of the number of sheets to be printed and that, as a result, paper, ink and time will again be wasted. Furthermore, when the requirement is for a large number of sheets to be printed, the above problems become more significant, making it impossible to provide a convenient printing system for users.

SUMMARY OF THE INVENTION

It is, therefore, one objective of the present invention to resolve all or, at the least, one of the above problems.

It is another objective of the present invention to provide an appropriate technique for a printing system wherein a digital camera and a printer are connected, or are integrally constructed, that can precisely perform printing on a plurality of sheets.

It is an additional objective of the present invention to easily resume printing when the printing based on the print setting information is interrupted.

It is a further objective of the present invention to reduce the waste of time and durable goods that is caused by an interruption.

To achieve these objectives, according to the present invention, a printing system, which continuously performs printing on a plurality of sheets based on print setting information including, at the least, information for designating an image to be printed, comprises:

input means for entering image data that are to be printed;

printing means for printing the image data entered by the input means;

storage means for, when printing based on the print setting information is halted, storing interrupt information concerning the printing completed before the interrupt; and control means for employing the interrupt information stored in the storage means to resume printing based on the print setting information.

It is one more objective of the present invention to ensure the use of desired print control information when the printing is resumed.

To achieve this objective, in addition to the above printing system configuration, the control means includes:

determination means for determining whether a memory card has been changed before and after the interrupt.

It is still another objective of the present invention to protect a printing apparatus when printing is interrupted.

To achieve this object, in addition to the above printing system configuration, when printing is halted by the printing means while an image is currently being output on one sheet of recording paper, the recording sheet on which printing is incomplete is discharged.

It is still an additional objective of the present invention to provide an appropriate form for a system wherein a digital camera and a printing apparatus, such as a portable printer, can directly communicate with each other for the printing of images.

The other objectives and features of the present invention will become apparent during the course of the following explanation, given for the preferred embodiments while referring to the accompanying drawings.

BRIEF DESCRIPTION OF THE DRAWINGS

FIG. 16 is a diagram showing a file designated for printing by the printing system according to the fifth embodiment;

FIG. 17 is a diagram showing the data structure indicating the printing status of the printing system according to the fifth embodiment;

DETAILED DESCRIPTION OF THE PREFERRED EMBODIMENTS

Figure 1:
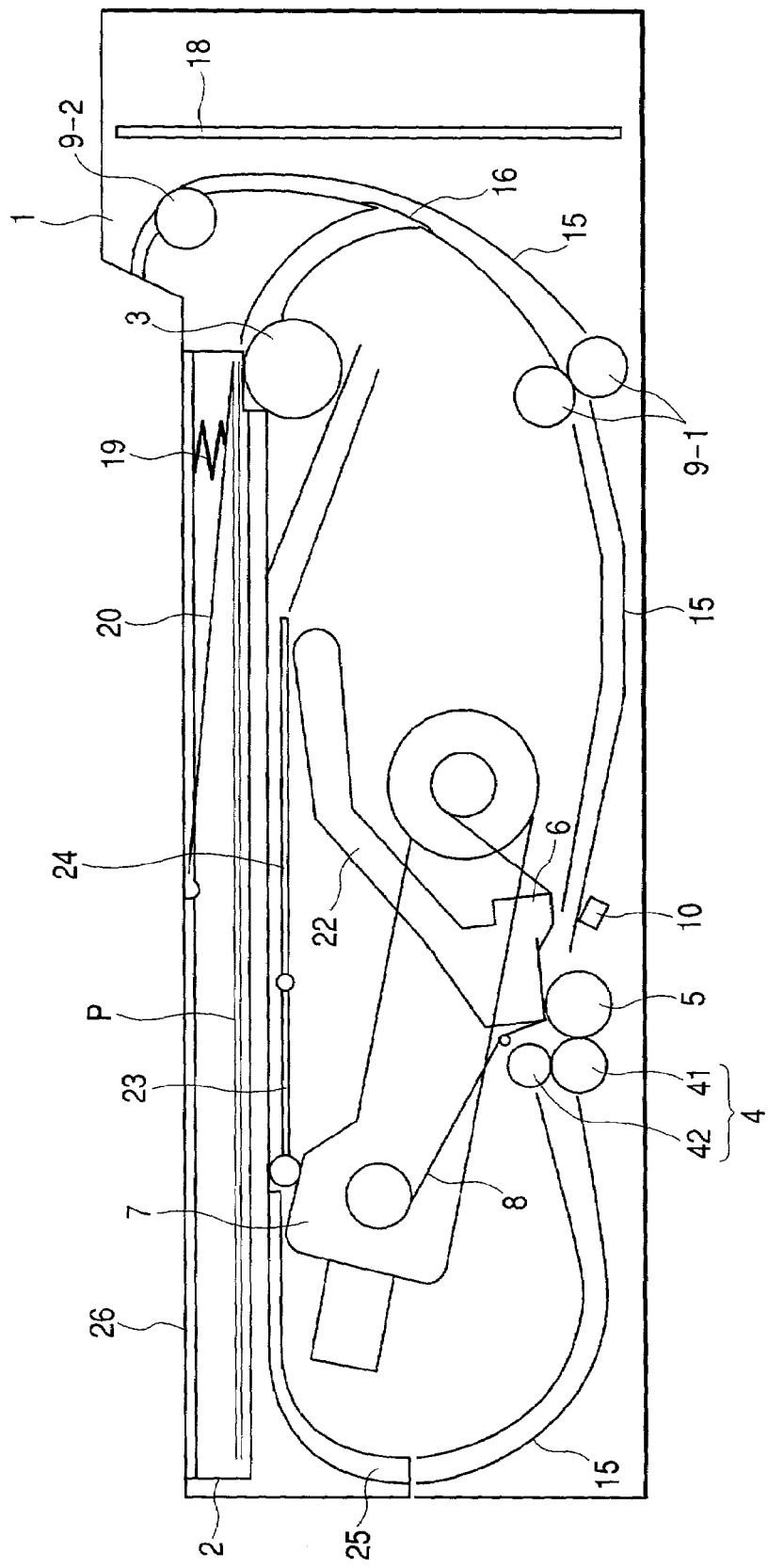
FIG. 1 is a specific diagram showing the configuration of a printing system according to a first embodiment of the present invention.

The preferred embodiments of the present invention will now be described while referring to the accompanying drawings.

First Embodiment

The basic system configuration according to a first embodiment will now be described while referring to FIGS. 1 to 7. This printing system employs a sublimation thermal transfer recording method for a printer, and can print digital image data on an arbitrary number of sheets. This printing system will now be described.

A common thermal transfer recording apparatus according to the embodiment of the present invention will be specifically explained while referring to the drawings.

FIG. 1 is a specific side view of the configuration of a recording apparatus according to the embodiment. In the general configuration of the recording apparatus, a feed roller 3 separates and singly feeds recording sheets P from a sheet cassette 2, which is loaded into a main body 1 of the apparatus and in which the recording sheets P are stored. At this time, a recording sheet P is brought into contact with the feed roller 3 by a pushing plate 21 urged by a spring 20. The recording paper P, conveyed by the feed roller 3, is then sandwiched by a conveyance roller pair 4 so that it reciprocates along the recording section. The conveyance roller pair 4 is constituted by a pinch roller 42 and a grip roller 41.

In the recording section, a platen roller 5 and a thermal head 6, which generates heat in accordance with recorded data, oppose each other with the recording sheet conveying path in between. An ink sheet 8 is stored in an ink cassette 7, and has an ink layer on which thermal melting or thermal sublimation ink is coated, and an overcoat layer that is overcoated on a printing face to protect it. When this ink sheet 8 is pressed against the recording sheet P by the thermal head 6 and is selectively heated, a predetermined image is transferred to and recorded on the recording sheet P, and the protective layer is overcoated.

The ink sheet 8, which is substantially equivalent in size to the printing area, is prepared by arranging on it yellow (Y), magenta (M) and cyan (C) ink layers and an overcoat (OP) layer, and is positioned so that it will cover the printing area on the recording sheet P. Inks from the individual layers are thermally transferred to the recording sheet P, and the thus formed images are superimposed, one on the other, by returning the recording sheet P to the record start position each time ink from one of the layers is transferred.

In this manner, the conveyance roller pair 4 is used for the reciprocation of the recording sheet P a number of times corresponding to the count of the ink color and the overcoat layers.

During this process, after the printing with each ink layer is performed, the recording sheet P is inverted at the front of the main body 1, and is guided to the rear of the main body 1 through the front portion of the cassette tape and the lower guide portion. Since the recording sheet is inverted at the front of the apparatus and is prevented from exiting during the printing process, space will neither be wasted nor will a user touch the recording sheet unintentionally, and the space required for the installation of the apparatus can be reduced.

In addition, since the lower portion of the sheet cassette 2 is directly employed as a paper guide, the thickness of the main body 1 can be reduced. Further, since the recording sheet P is passed through the gap defined by the ink cassette 7 and the sheet cassette 2, the overall height of the main body 1 can be minimized, and as a result, the apparatus can be compactly made.

A sheet conveyance guide 25 for the sheet cassette 2 inverts, at the rear of the main body 1, the recording sheet P after it has been inverted and transported from the front of the main body 1. The provision of the sheet conveyance guide portion for the sheet cassette 2 contributes greatly to the reduction in the overall size of the main body 1.

The upper portion of the paper cassette 2 serves as a tray portion 26 on which the recording sheet P is printed and discharged, and contributes to the size reduction of the main body 1.

After the printing of the ink layers is completed, the recording sheet P is guided to discharge rollers 1 (9-1) and 2 (9-2), and is discharged from the rear toward the front of the main body 1. Thus, the recording operation is terminated. The discharge roller 1 is designed so that it is pressed only when the recording sheet P is discharged, and so that no stress is applied thereto during printing.

A guide unit 15 for the recording sheet P is provided for the main body 1, and is used to guide the recording sheet P.

A conveyance path change sheet 16 is used along which the recording sheet P that has been fed is guided to the path on the discharge side.

The thermal head 6 is integrally formed with a head arm 22, and to replace the ink cassette 7, the thermal head 6 is retracted to a position that does not interfere with the replacement of the ink cassette 7. With this retraction, the ink cassette 7 can be changed by removing the sheet cassette 2, and while interlocking with the detachment of the sheet cassette 2, the head arm 22 is raised or lowered by retracting a cam 2-1 of the sheet cassette 2 from the position whereat it is pressed down by a cam unit 221.

Since with the common thermal transfer recording apparatus three YMC colors are printed in order, the edges of the printed images for the individual colors must be accurately aligned. For this alignment, the conveyance roller pair 4 in FIG. 1 must securely sandwich and convey the recording sheet P, and for feeding, non-printable margins are required at the ends of the recording paper P. Therefore, in order to easily obtain printed material having no edges, as is shown in FIG. 3, perforations 12 are formed in the recording sheet P, so that the margin that is securely sandwiched by the conveyance roller pair 4 when the recording is started and on which no images are recorded can be easily detached and removed by hand.

The present invention is implemented by the recording sheet P in which the perforations 12 are formed and the thermal transfer recording apparatus, and an overcoating process is performed for the perforated area in the recording sheet P.

Figure 3:
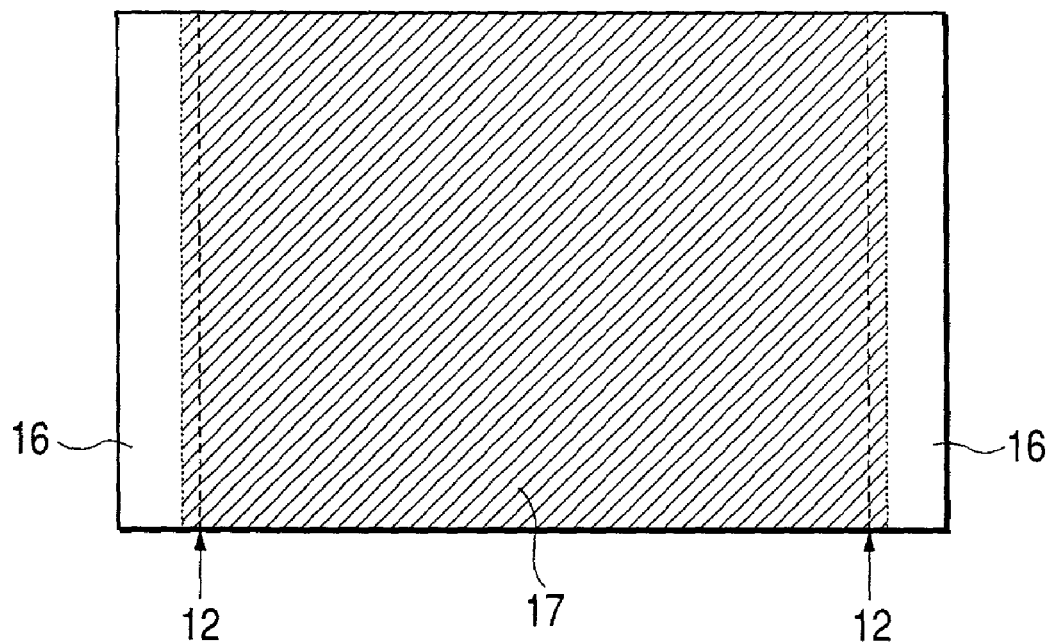
FIG. 3 is a diagram showing a recording sheet according to the first embodiment.

The shaded area in FIG. 3 indicates the printing area, and an image is printed into the area that includes the perforations 12. The over-coated area is a substantially sized printing area that covers an area slightly larger than the printing area.

The recording apparatus will now be described in more detail.

In the recording apparatus in FIG. 1, the conveyance roller pair 4 includes a pinch roller 42 and a grip roller 41. The grip roller 41 is directly connected, via a speed reduction mechanism, to the output shaft of a stepping motor (not shown), and is rotated forward and backward by the stepping motor. Since the recording sheet P is securely sandwiched and reciprocated by the conveyance roller pair 4, the recording sheet P is also accurately positioned or conveyed as the stepping motor rotates. Assume that, as an example, 85 mm is the pitch of one line recorded by the thermal head 6, and four steps is the number of steps required by the stepping motor to convey the recording sheet P at distance equivalent to one line. Then, when the stepping motor is controlled so it moves four steps, the recording sheet P can be conveyed a distance equivalent to one line, i.e., 85 mm. When the printing range in FIG. 3 is defined as 144 mm in the sheet conveyance direction, 1694 lines can be printed, and in order to convey the recording sheet P this distance, the stepping motor need only be rotated 6776 steps.

In the recording apparatus in FIG. 1, when the conveyance roller pair 4 is viewed from the feed roller 3, a tip detection sensor 10 is located near the conveyance roller pair 4 for detecting the tip of a recording sheet P. After the detection of the tip, within the range wherein the recording sheet P can be held by the conveyance roller pair 4, the recording sheet P is conveyed at distance the equivalent of a predetermined number of lines and is halted. This position is used as the recording start position. At this position, the thermal head 6 is driven and heated in accordance with the recording information, and predetermined images in individual colors, beginning with yellow Y, are printed, or the overcoat layer is transferred. When the printing for one color has been completed, the recording sheet P is returned from a position leading toward the discharge roller 9 a distance equivalent to the predetermined number of lines, and the transfer of YMC colors and the overcoat layer is repeated four times.

In the recording apparatus 1 in FIG. 1, the distance between the position of the tip detection sensor 10 and the position whereat the recording sheet P is pressed against the thermal head 6 by the platen roller 5 is set as 20 mm on the recording sheet P, while taking into account the arrangement of the internal parts. This distance, however, may be altered as needed. At this time, the printing material in FIG. 3 is obtained by transferring the individual ink colors and the overcoat layer in the following manner.

Figure 2:
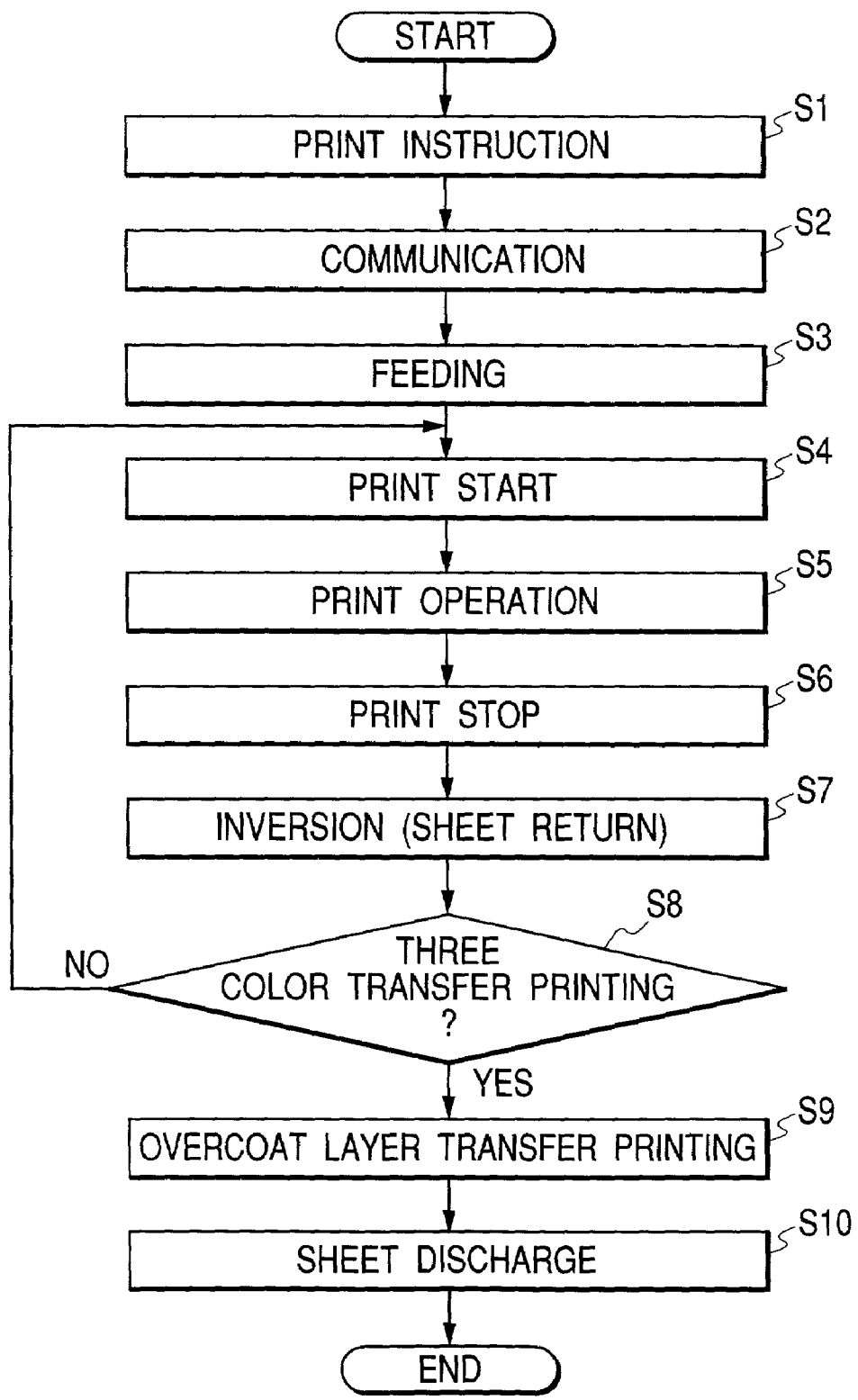
FIG. 2 is a flowchart for the first embodiment.

The color ink transfer and the over-coating sequence will now be described while referring to the flowchart in FIG. 2.

S1: A user instructs printing by entering a print command using a print button (not shown), a digital camera or a digital video camera.

S2: An internal processing circuit 18 in the main body 1 initiates communication with the machine that has executed the print instruction. The processing circuit 18 confirms conditions necessary for printing with the machine that executed the print instruction, and as needed, performs image processing for print information included in image data.

S3: When the printing process is ready, the processing circuit 18 drives a motor connected to the feed roller 3, and begins to feed the recording sheet P.

S4: After the tip of the recording sheet P is detected, the stepping motor is rotated a predetermined number of steps, and printing is started. At this time, the print start position is 12.465 mm, with the tip of the recording sheet P being used as a reference.

S5: Sequentially, while the stepping motor is rotated four steps, the thermal head 6 is heated to print a one line image. When the stepping motor has been-rotated a total of 6776 steps (equivalent to 1694 lines), the printing is terminated. The print end position is 156.455 mm, with the tip of the recording sheet P being used as a reference.

S6: Then, for speed reduction before halting, the stepping motor is rotated about by forty steps, the equivalent of ten lines, and is halted.

S7: In this state, the stepping motor is driven backward and the recording sheet P is transported, in the opposite direction to the printing direction, at distance equivalent to a predetermined number of steps (6776 steps—steps equivalent to speed reduction). Further, to reduce the speed, the stepping motor is rotated forty steps, the equivalent of a predetermined number of lines, i.e., ten lines, and is halted.

S8: The above process is repeated three times for the YMC colors, and desired images are transferred and recorded on the recording sheet P.

S9: Thereafter, the process is performed once more to transfer the overcoat layer to the recording sheet P in order to protect the printing face.

S10: Thereafter, the stepping motor is rotated backward to guide the recording sheet P to the discharge roller 3. The recording sheet P is then discharged by the discharge roller 3, and the processing sequence is terminated.

In the above processing, for controlling the recording position, first, when the recording sheet P is fed, the control means 19 manages the number of steps the stepping motor is rotated during the entire printing process, based on a tip detection signal obtained by the tip detection sensor 10, the number of steps rotated by the stepping motor, and the position of the recording sheet P when it is being conveyed. However, as another method used to manage the recording position, in the process performed to transfer the YMC colors and the overcoat layer, a detection sensor may be provided at the tip of the recording sheet, and by using the tip detection signal as a reference, the number of steps for rotating the stepping motor may be controlled.

Further, in the above description, the overcoat layer is transferred only by setting or halting the heat generation of the thermal head 6. However, at the start of the transfer of the overcoat layer, the amount of heat generated may be gradually increased, and at the end of the transfer of the overcoat layer, the amount of heat generated may be gradually reduced.

The machine for executing the print instruction at S1 and the communication with the printer apparatus will now be described in more detail.

Figure 4:
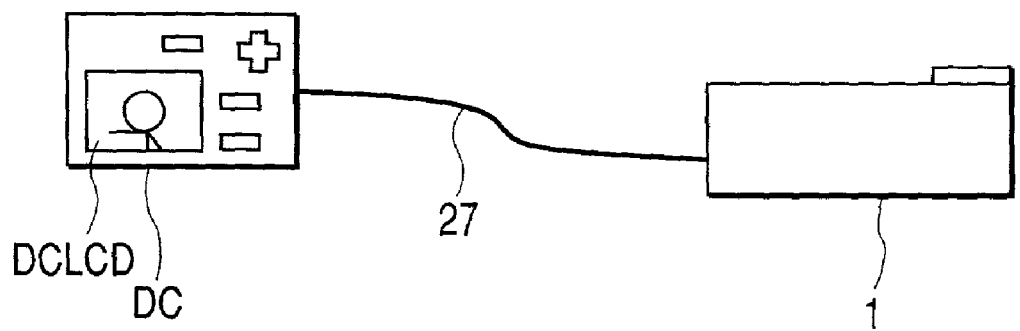
FIG. 4 is a diagram showing the line connection according to the first embodiment.

An explanation will be given for a digital camera DC as an example for the execution of a print instruction. FIG. 4 is a specific diagram of the digital camera DC and the main body 1 of the printer apparatus that are connected together. It should be noted that the digital camera DC holds obtained image data in an internal memory. A detachable memory, such as a compact flash card or a smart medium, is convenient; however, another memory type may be employed.

Assume that the digital camera is set in a reproduction mode and an arbitrary image is currently being reproduced.

Since the reproduction of image data can be performed as needed by using the liquid crystal display device of the digital camera DC, a user can arbitrarily retrieve favorite image data. When the digital camera DC can communicate with the main body 1 through a cable 27 or by wireless means, necessary information can be transmitted from the digital camera DC to the printer apparatus by using a predetermined print button (not shown), and can be printed by the main body 1 of the printer apparatus.

The necessary information is information concerning negotiation with the digital camera DC, information for an image to be printed, information added to the image data during or after the image is picked up, or print control information, such as the printing size, the number of sheets to be printed or a trimming designation.

Figure 5:
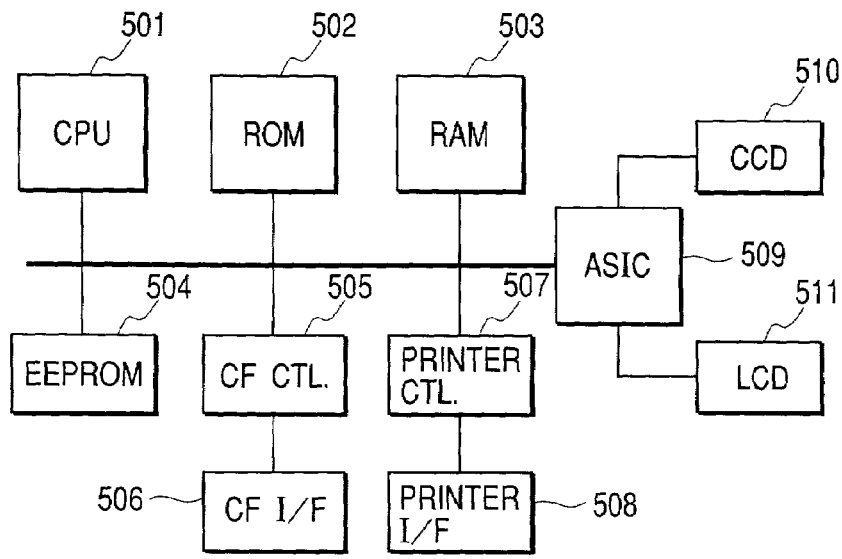
FIG. 5 is a schematic system block diagram showing a camera according to the first embodiment.

The contents concerning the present invention will now be described in more detail. FIG. 5 is a schematic system block diagram for a camera.

A CPU 501 controls the camera, a flash program ROM 502 is used to store a control program for the CPU 501, a display font, graphics data and print font data. A work DRAM 503 is used by the CPU 501. A writable EEPROM 504 is used to store the printing status. A circuit 505 controls a CF (Compact Flash memory), which is a removable medium for storing image data obtained by the camera, and an IF connector 506 is provided for the circuit 505. A control circuit 507 communicates with the printer apparatus, and an I/F connector 508 is provided for the control circuit 507.

A CCD 510 is the image pickup element of the camera, and an LCD 511 is the liquid crystal display of the camera. An ASIC 509 performs various image processes for the image obtained by the CCD 510, and controls the process for image display on the LCD 500. The CCD 510, which is the image pickup element, includes high-level functions: such as a function for performing a coloring process and for generating a JPEG file and storing it in the CF memory; a function for compressing or expanding the image file into a JPEG image; a function for re-sizing the image size; and a control circuit for controlling the display on a liquid crystal display device.

Figure 6:
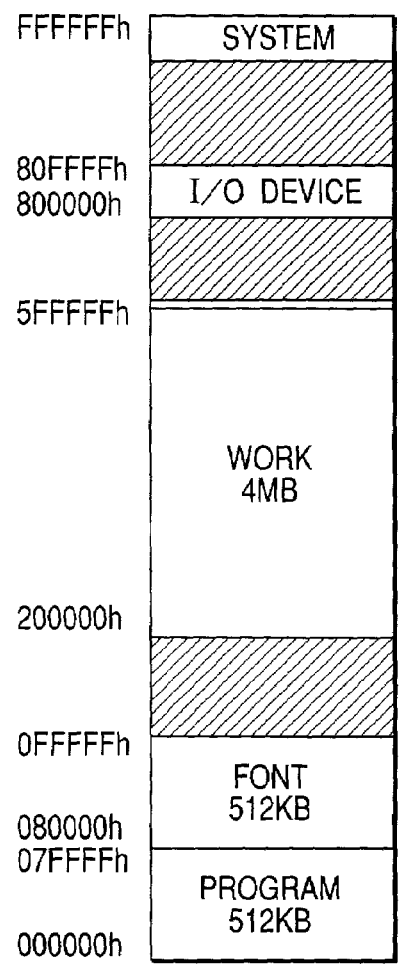
FIG. 6 is a schematic diagram showing a memory map for a camera system according to the first embodiment.

FIG. 6 is a schematic diagram showing a memory map for the camera.

The program used by the CPU 501 is stored at 000000h to 07FFFFh, and the display font, the graphics data and the print font data are stored in 080000h to 0FFFFFh. 200000h to 5FFFFFh are allocated as the work RAM for the CPU 501, and are used for the image data processing and for the communication with the printer.

Although detailed addresses are not shown, 800000h to 80FFFFh are allocated as the I/O area.

First, on the camera side, images to be printed that are recorded in the CF are selected using the UI (not shown). The number of sheets to be printed, the path for the image and a file name, all of which are print control information for each selected image, are stored as the overall print information in the work RAM, and are also stored in the EEPROM 504.

By repeating this process a plurality of times, the print control information for multiple images can be stored as the overall print information.

When the images have been selected, the printing processing is initiated by depressing a predetermined print button (not shown).

The printing processing will now be described while referring to the flowchart in FIG. 7.

Since the initial printing is to be performed the first time, program control is shifted from S501 to S502, the data for an image to be printed are transmitted to the printer 1 based on the overall print information, and reception of a print end status from the printer 1 is waited for (S502). When one sheet of the image designated in the overall print information is printed, program control is shifted to S504, and the number of sheets to be printed, which is designated for the pertinent image, is decremented by one. When the remaining number of sheets to be printed is not zero at S510, program control returns to S502 and the printing of the same image is repeated until the printing of the number of sheets equivalent to the designated value is completed. When the number of sheets to be printed is zero at S510, at S511 the number of sheets to be printed, the path and the file name, all of which constitute the print control information for the printed image, are cleared.

Further, at S503 a check is performed to determine whether another image is set for printing. When images to be printed still remain, program control is shifted to S502, whereat the designated image is fetched by the printer 1, and the printer repeats the printing of the designated number of sheets.

When the printing of the number of sheets designated in the overall print information is completed (Yes at S503), the overall print information is cleared (S505) and the printing processing is terminated. When the number of sheets to be printed, the path and the file name, which are the overall print information for an image to be printed, are corrected, the data in the EEPROM 504 is also corrected.

If the capacity of the battery of the camera is reduced while a plurality of sheets are printed and the printing can not be continued, the battery of the camera must be exchanged and the camera re-activated.

For example, when the power capacity of the camera is reduced while printing is performed in accordance with the above described overall print information, and only a predetermined voltage or lower is output, the printing is halted and interrupt information with which where the printing has been performed can be identified is stored in the EEPROM 504 of the camera. The print setup information or the interrupt information may be stored on a memory card (CF) detachable from an apparatus whereat images are recorded.

The interrupt information may be updated and recorded each time an image sheet is printed, regardless of the power capacity of the battery.

If it is ascertained that the power capacity is reduced and the printing is to be interrupted soon, each time following this determination the printing of one sheet is completed, the interrupt information may be updated and recorded.

The place where the interrupt information is recorded may be not only a memory card, but may be a memory installed in the printer 1.

Further, the interrupt information may be recorded in both the memory of the camera and the memory of the printer 1. This is useful for determining whether interrupt information and overall print information have been changed before and after printing is halted.

When the printer 1 does not receive data during the print data reception process, the printer 1 determines that an error has occurred and halts the process. Then, the printer 1 performs a predetermined recovery process, and waits to receive data while remaining in the printing enabled state.

The power supply is exchanged or a change is made to an AC power source to activate the camera, and the printing processing is performed again by depressing a predetermined print button.

When it is ascertained at S501 that the interrupt information is recorded in the EEPROM 504, it is recognized that printing is currently being performed, and a process at S506 is automatically initiated so as to instruct the resumption of printing where it was halted.

It should be noted that, when it is ascertained at S501 that the printing is currently being performed, the user may be permitted to determine whether printing based on the print control information is to be performed from the beginning.

At S507, a check is performed to determine whether the overall print information is stored in the EEPROM 504. When based on the file data there is no file to be accessed because the CF has been removed or the image data stored in the CF have been changed or erased, at S509 an instruction for examining the CF is issued to a user, and program control exits the printing processing without the resumption process being performed. When it is ascertained the CF used before the printing was interrupted is still being used and that the overall print information has not changed, the printing process at S502 is initiated and the above processing is repeated until the printing is completed.

The determination relative to the CF can be performed when, before printing is interrupted, the copy of the print control information is stored in the memory of the printer 1 or the FAT information on a memory card is copied to the memory of the printer 1, and these copies are compared when the printing is resumed. However, this is not the only determination method that can be used.

Further, since the CF from which the user is to print image data is generally known, the process at S507 is not always required; however, it is better for this determination process to be prepared.

In addition, the print information can be written to the flash ROM 502 instead of the EEPROM 504.

Second Embodiment

A second embodiment of the present invention will now be described while referring to FIGS. 7 and 8.

The same reference numerals as are used in the first embodiment are also used to denote components that perform the same processing as is performed in the first embodiment, and no further explanation for them will be given.

First, at the camera, images to be printed that are recorded in the CF are selected using the UI (not shown).

The number of sheets to be printed, the path for the image and a file name, all of which are print control information for each selected image, are stored as the overall print information in the work RAM, and are also stored in the EEPROM 504. By repeating this process a plurality of times, the print control information for multiple images can be stored as the overall print information.

In addition, file data recorded in the CF are also stored in the EEPROM 504. When images are selected, the printing is initiated by depressing a predetermined print button (not shown).

Figure 7:
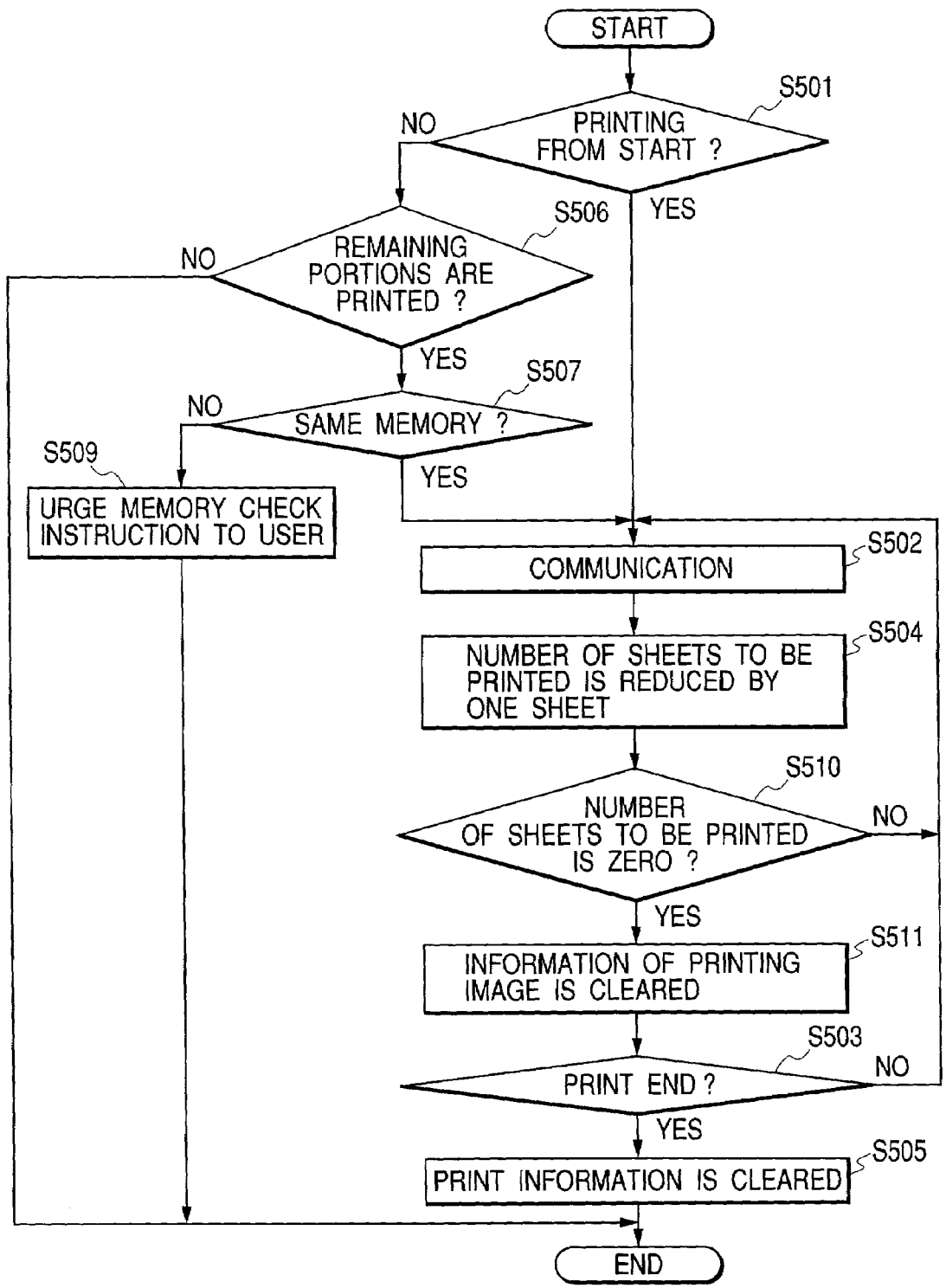
FIG. 7 is a flowchart showing the printing process according to the first embodiment.
Figure 8:
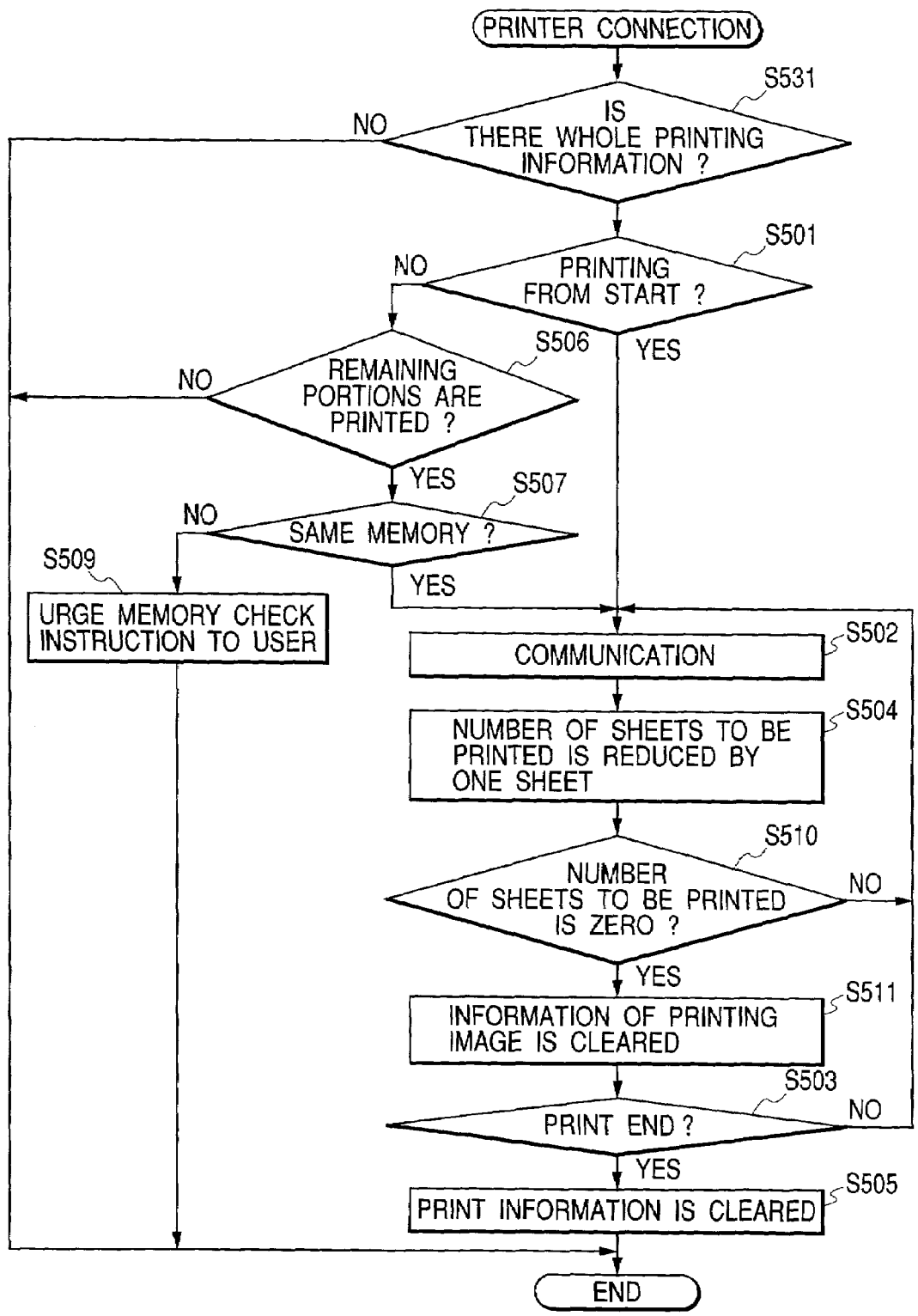
FIG. 8 is flowchart for the printing process performed when a system is activated according to a second embodiment.

The printing processing is performed in the same manner as is shown in the flowchart in FIG. 7 for the first embodiment.

If the capacity of the battery of the camera is reduced while a plurality of sheets are printed, and the printing can be continued no longer, the battery of the camera must be exchanged or a change must be made to an the AC power source and the camera reactivated.

When the printer 1 does not receive data during the print data reception process, the printer 1 determines that an error has occurred, and halts the process. Then, the printer 1 performs a predetermined recovery process, and waits to receive data while remaining in the printing enabled state.

While referring to FIG. 8, an explanation will now be given for the processing for the exchange of batteries, or for changing from battery power to an AC power source to activate the camera.

When the camera is powered on, the connection with the printer 1 is automatically examined, and when the connection has been established, the following process is initiated.

When it is ascertained at S531, by referring to the overall print information and the interrupt information stored in advance in the EEPROM 504, that the printing process is still incomplete, program control is shifted to S501. The following process is then performed in the same manner as in the first embodiment.

As is described above, since it is expected that when the battery power is exhausted the battery will be immediately exchanged for a new one or a switch will be made to an AC power source, and since normally the user desires to continue printing following this process, the processing in this embodiment for smoothly recovering and continuing to print can improve the usability.

The second embodiment is also more effective for use in a case where the time at which printing is halted is stored in the interrupt information, and the process is recovered within a predetermined period of time following the interrupt time included in the interrupt information.

At this time, the printing is automatically resumed, beginning with the image data in the print control information that has not yet been printed because of the interrupt. This is because it is obvious that the user will desire a quick recovery, and because in this case the above embodiment is appropriate.

Third Embodiment

A third embodiment according to the present invention will now be described while referring to FIGS. 1 to 6 and 9. The same reference numerals as are used in the first embodiment are used in this embodiment to denote components that perform the same processing as in the first embodiment.

First, at the camera, images recorded in the CF that are to be printed are selected using the UI (not shown).

The number of sheets to be printed, the path for an image and a file name, all of which are print control information provided for each selected image, are stored as the overall print information in the work RAM. Also, the print control information for an image obtained by the camera is stored as a print information file in the root directory of a CF memory connected to the CF I/F 506.

When the images have been selected, the printing is initiated by depressing a predetermined print button (not shown).

Figure 9:
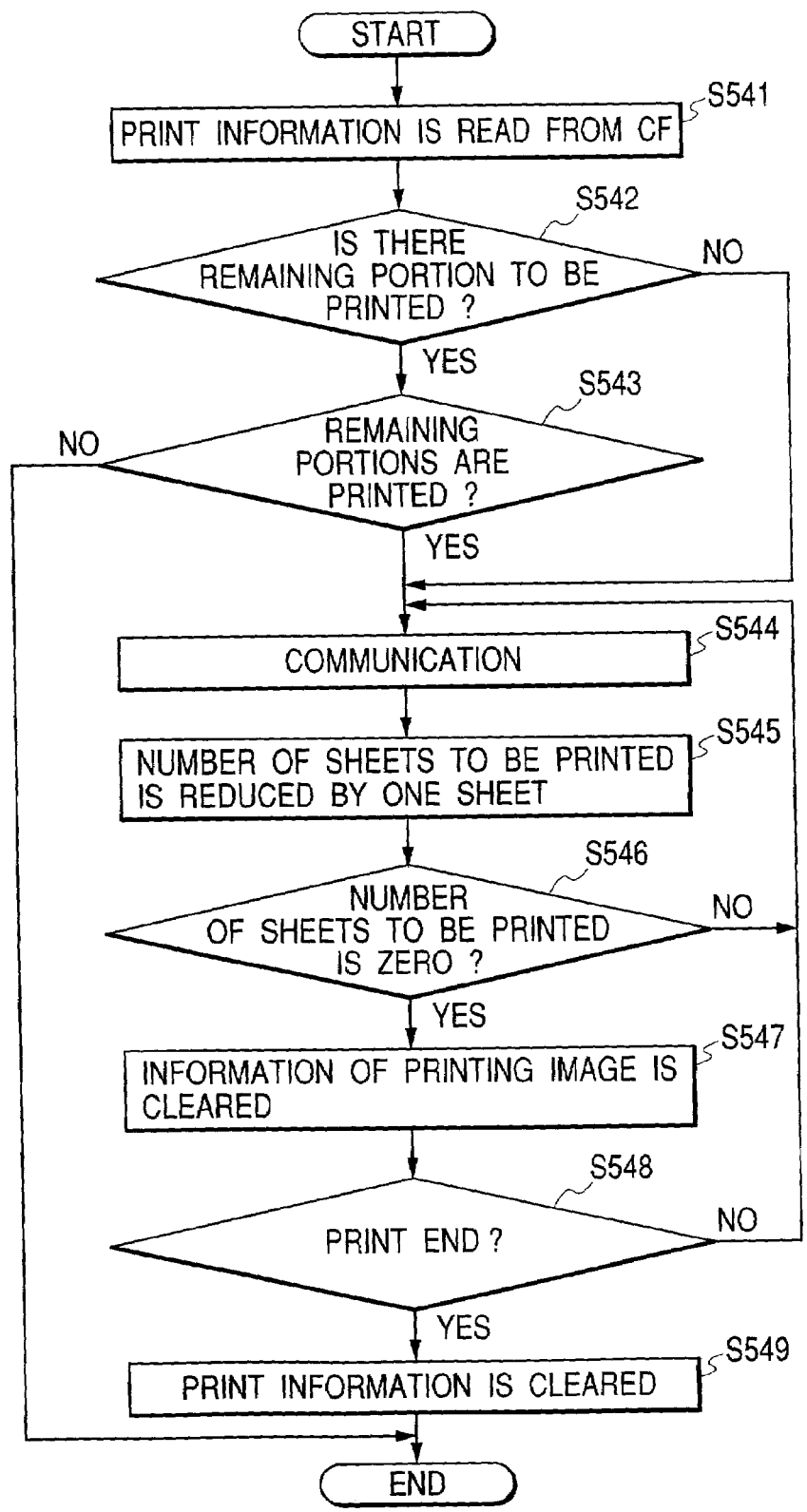
FIG. 9 is a flowchart for the printing process according to a third embodiment.

The processing will now be described while referring to the flowchart in FIG. 9.

When the printing is initiated, at S541 the overall print information is read, and based on this information, the communication process at S544 is begun. The data is transmitted to the printer 1, and the reception of a print end status from the printer 1 is waited for (since initially the interrupt information is not stored, it is ascertained at S542 that no image data remains to be printed, and program control is shifted to S544).

When one sheet has been printed and when after S545 and S546 the printing is to be continued, program control is returned to S544. When no more printing is required, program control advances to S547 whereat information concerning the printing of the images is deleted from the overall print information. In addition, at S548 a check is performed to determine, by referring to the overall print information, whether any images remain to be printed. When there are no more images to be printed, program control advances to S549, and the print control information is cleared. The printing processing is thereafter terminated.

When images remain to be printed, program control returns to S544, and the printing is continued.

When the number of sheets to be printed, the path and the file name, which together constitute the overall print information for an image to be printed, are corrected, the print information in the root directory of the CF memory is also corrected.

If the capacity of the battery of the camera is reduced while a plurality of sheets are being printed, and the printing can no longer be continued, the battery of the camera must be exchanged and the camera re-activated.

When the printer 1 does not receive data during the print data reception process, the printer 1 determines that an error has occurred, and halts the processing. Then, the printer 1 performs a predetermined recovery process, and waits for the data reception while remaining in the printing enabled state.

The processing peformed when the camera is powered on will now be described.

When the camera is powered on and the printing operation is selected, at S541 a print information file in the root directory of the CF memory is analyzed, and when at S543 the user elects to continue printing, the printing process at S544 is initiated and is repeated until the printing of a designated number of sheets has been completed.

Further, when the camera is powered on and it is ascertained, as in the second embodiment, that the connection with the printer 1 has been established, continuous printing can be automatically performed.

Fourth Embodiment

A fourth embodiment according to the present invention will now be described while referring to FIGS. 10 to 13.

The same reference numerals as are used for the first embodiment are for this embodiment to denote components that perform the same operation as in the first embodiment, and no further explanation for them will be given.

It is assumed that the system in the fourth embodiment is one wherein a printer is integrally formed with a digital camera so that images can be printed immediately, upon request. This system, which employs the ink-jet recording method, can store image data in a memory by using digital image pickup, and using the video data stored in the memory, can print an arbitrary number of sheets. The system will now be described in accordance with the operations performed.

Figure 12:
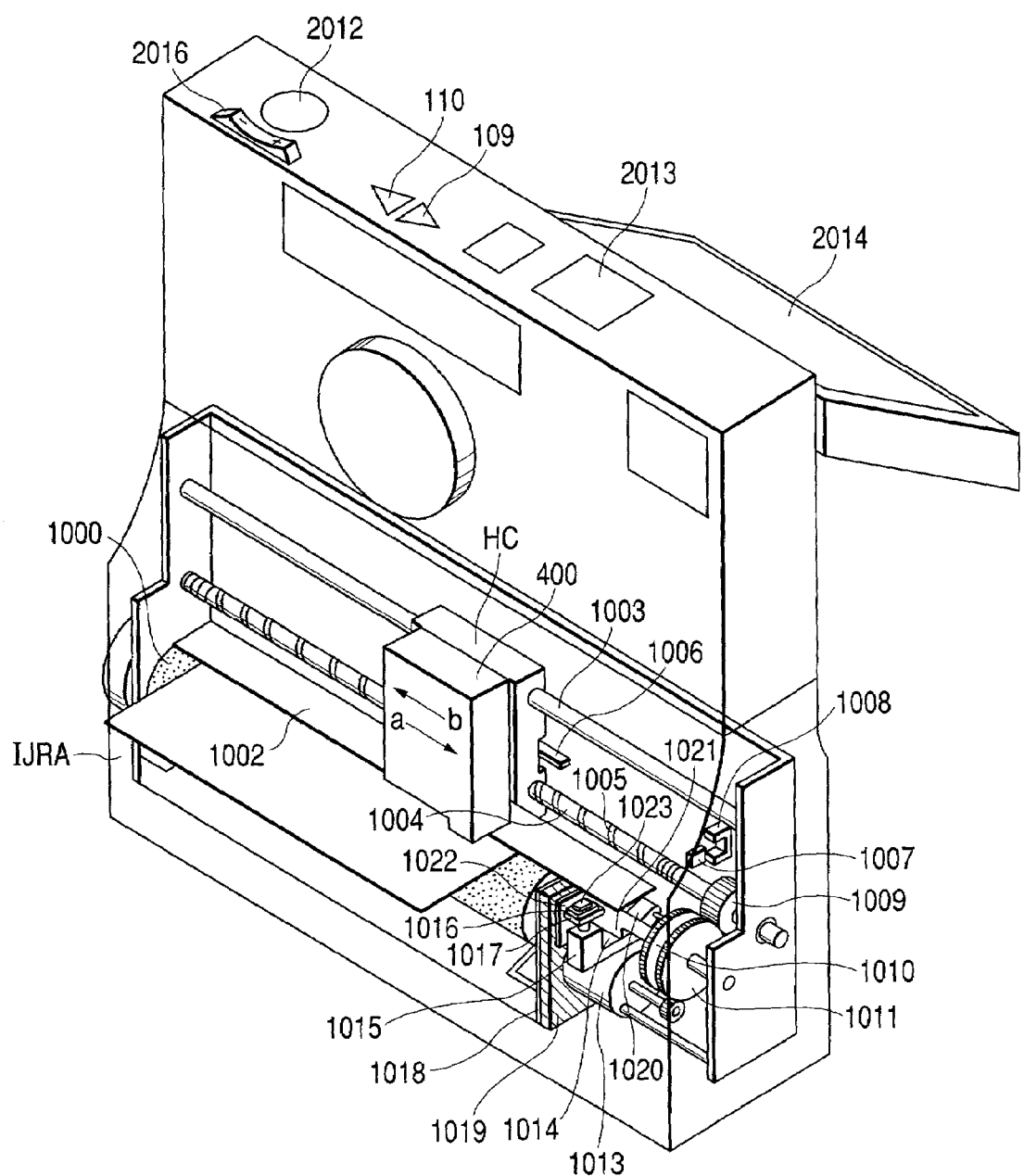
FIG. 12 is a flowchart for the printing process according to the fourth embodiment.

FIG. 12 is a conceptual diagram showing an inkjet recording apparatus IJRA for which a camera with a printer according to the present invention is employed.

A carriage HC has a pin (not shown) for engaging a spiral groove 1005 in a lead screw 1004 that is rotated, via drive force transmission gears 1011, 1010 and 1009, while interlocking with the forward and rearward rotation of a drive motor 1013. The carriage HC is reciprocated in the directions indicated by arrows a and b.

An ink-jet cartridge head 400 is loaded in the carriage HC. A sheet of paper is guided and pressed against a platen 1000 by a guide rod 1003 and a sheet pressing plate 1002 in the direction in which the carriage HC is moved. Photocouplers 1007 and 1008 are home position detection means for identifying the presence in this area of a lever 1006 for the carriage HC, and for changing the rotational direction of the motor 1013.

A member 1016 supports a cam member 1022 for capping the front face of a recording head 400. Suction means 1015 for attracting the inside of the cam member 1022 performs the attraction and recovery of the recording head 400 via a cap opening 1023.

A member 1019 moves a cleaning blade 1017 forward and backward, and a support plate 1018 is supported by the cleaning blade 1017 and the member 1019. The blade 1019 is not limited to this form, and another well known cleaning means can be employed for this embodiment.

A lever 1021 is used to start the suction, and contacts a face 1014 of the suction means. The lever 1021 is moved as a cam 1020, for engaging the carriage HC, is moved, and the driving force provided by the motor is transmitted using a well known transmission means, such as a clutch switching means.

When the carriage HC is positioned in the home position area, a desired process, either capping, cleaning or attraction and recovery can be performed at that location by the lead screw 1005. When a desired operation is performed at a well known timing, the operation can be applied for the embodiment.

In addition, an image forward button 110 and an image return button 109 are used to select an image to be printed or reproduced, and with these buttons, an image displayed on display means 511 can be changed.

Figure 13:
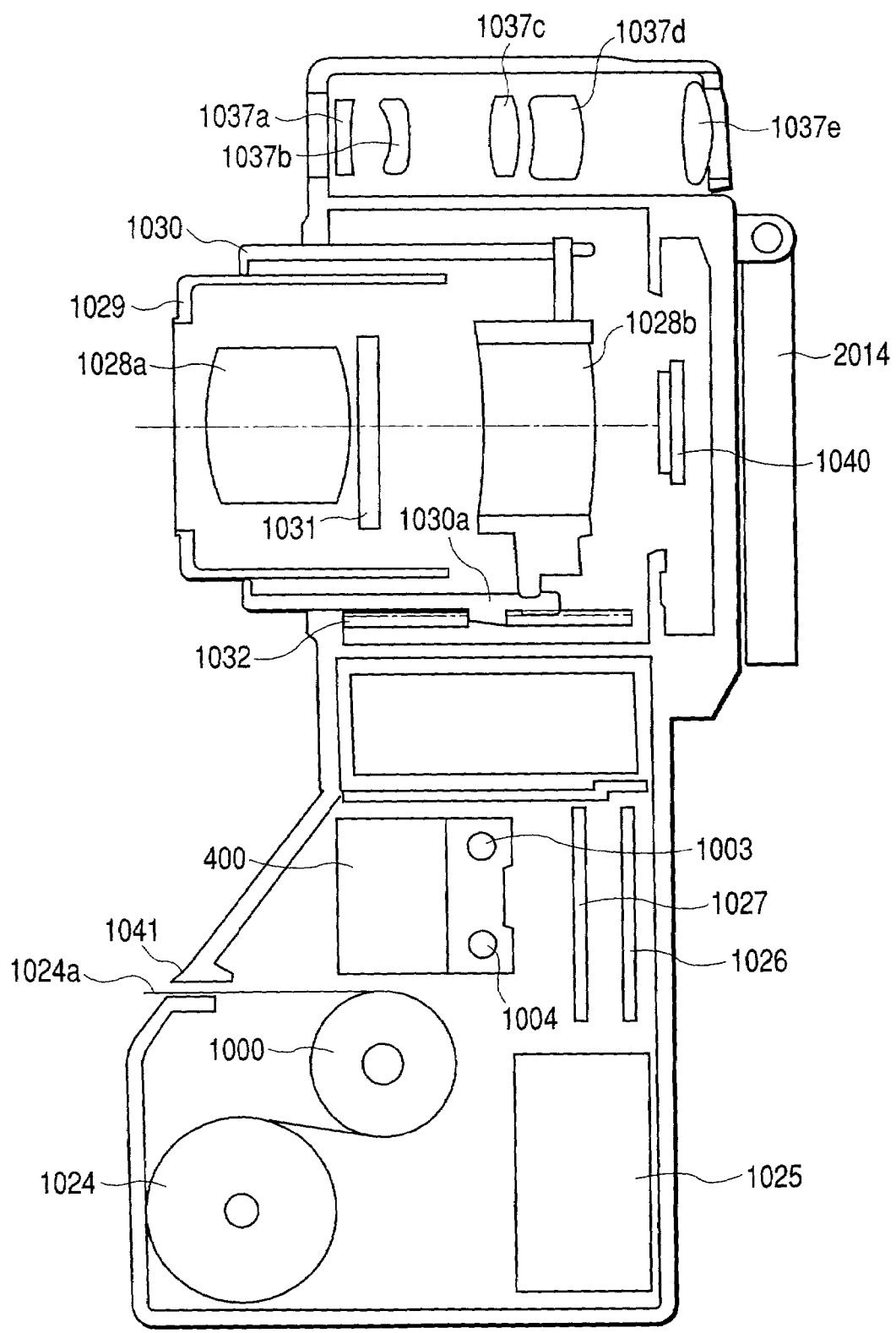
FIG. 13 is a conceptual diagram showing an inkjet recording apparatus according to the fourth embodiment.

FIG. 13 is a conceptual cross-sectional center view of a camera with a printer according to the present invention.

In the camera, lens units 1028a and 1028b of optical pickup systems are located in mirror barrels 1029 and 1030 of a two-level settlement type. An aperture unit 1031 for controlling the light flux and the amount of exposed light is also located in the mirror barrel 1029. A helicoid member 1032 for rotating the mirror barrel 1030 engages a raised portion 1030a of the mirror barrel 1030, and is driven by a helicoid motor (not shown).

The light flux passed through the optical pickup systems 1028a and 1028b and a shutter unit 1031 is concentrated on a solid pickup device (CCD) 1040.

Optical lenses 1037a, 1037b, 1037c, 1038d and 1039e constitute an optical finder. The optical lenses 1037b, 1037c and 1038d are moved as the optical systems adjust the image angle (zooming operation), so that substantially the same image angle as that of the optical systems can be identified. The optical finder is effective for preventing the consumption of power due to the employment of a liquid crystal display panel 2014 for image display. The aperture unit 1031 is driven so that an appropriate amount of light exposed by the solid pickup device 1040 can be maintained by the feedback control.

An image pickup signal is processed by an image processing substrate 1026. The resultant signal is transmitted to a printer control substrate 1027, whereat the signal is transmitted to a motor required for printing along with other information, such as a position control signal obtained from the ink-jet cartridge 400 of the printer.

The printing operation is initiated by a print button 2013. During this process, a print sheet 1024a is extracted from a printer roll 1024 through the platen 1000 and is used for printing. A sheet cutter 1024 is formed as a housing cover, and is used to separate the printed sheets 1024a. A power source 1025 is provided at the bottom.

The basic image pickup and printing processing will now be described.

Figure 10:
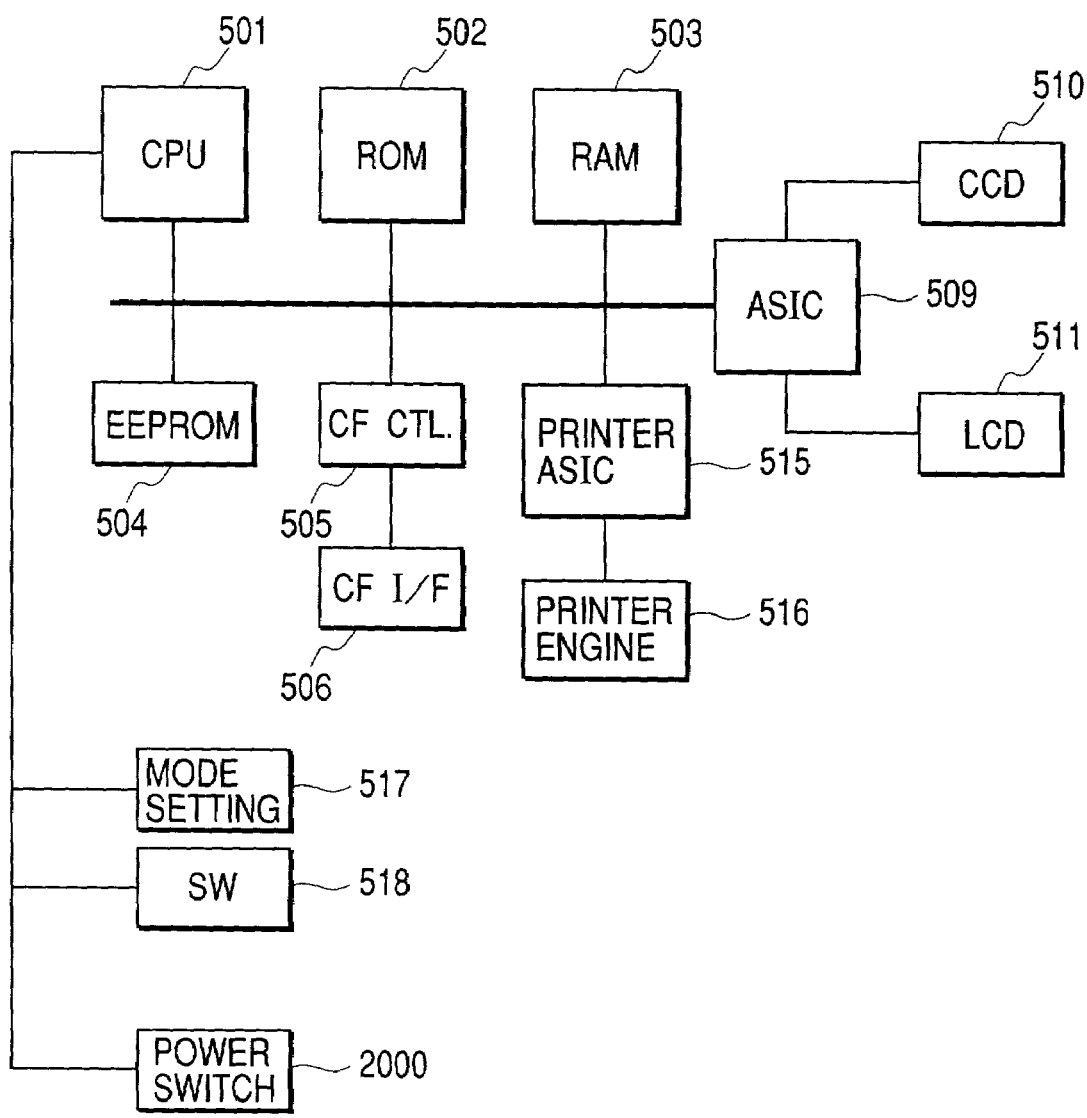
FIG. 10 is a schematic system block diagram for a fourth embodiment.
Figure 11:
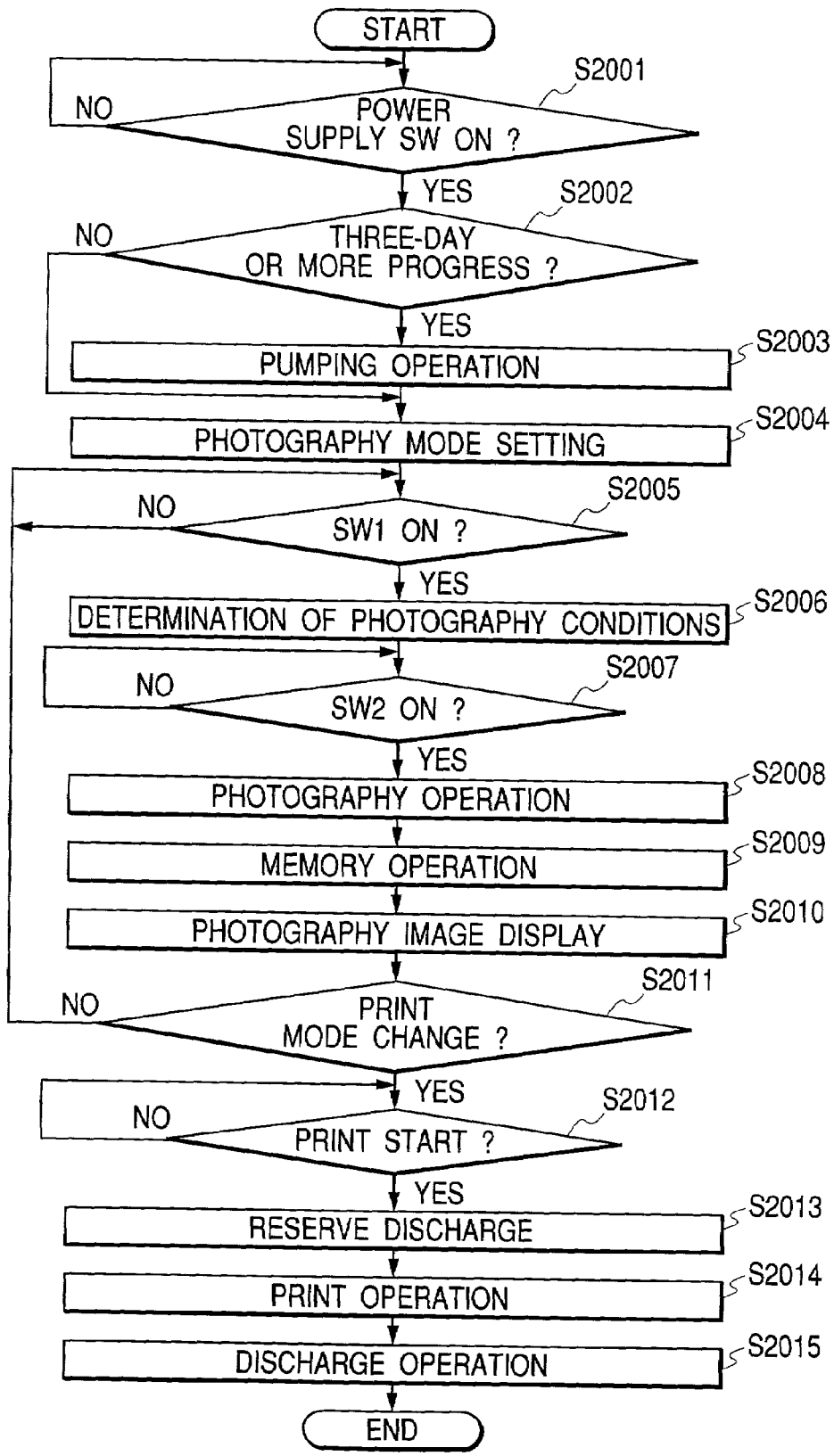
FIG. 11 is a flowchart for the processing according to the fourth embodiment.

FIG. 10 is a schematic block diagram showing an image pickup apparatus with a printer, and FIG. 11 is a basic flowchart.

The printing operation explained while referring to FIG. 11 is performed on the assumption that an image selectively displayed is printed contemporarily, and not that a plurality of images are automatically printed in accordance with the overall print information.

When an operator turns on a power switch 2000 (S2001), a CPU 501 determines whether, at the least, a predetermined period of time (72 hours in this embodiment; however, another time period may be employed) has elapsed since this apparatus was previously employed and powered off (S2002). If at least 72 hours have passed, the CPU 501 issues a recovery pumping instruction to a printer ASIC 515 that is in charge of controlling a printer 4, so that the printer 4 is driven (S2003).

The recovery pumping is performed to make more effective the recording by an ink-jet recording apparatus that will be described later, and during this process, a recording head is cleaned by means such as a suction pump before the recording on the paper is initiated. As the index for the cleaning, in this embodiment, the cleaning is performed when the unit is powered on following the elapse of a 72 hour idle period.

To pick up an image, an operator employs mode setting means 517 to designate a pickup mode (S2004). In this embodiment, several modes, such as the normal mode and a portrait mode, are provided. More specifically, a mode is designated by using a mode select switch 2015 for the mode setting means 517, and a signal is transmitted to the CPU 501. When the operator adjusts the image angle using the zoom lever 2016 and depresses a SW 518 (corresponding to the shutter button 2012 in FIG. 12) down to a first stroke, signal SW1 is entered (S2005).

The CPU 501 drives a pickup unit 510 via an ASIC 509 that serves as a pickup controller, and determines various conditions required for an exposure operation, such as an exposure control value, distance information and the need of a strobo flash (S2006).

When the operator further depresses the SW 518 (corresponding to the shutter button 2012 in FIG. 12) in order to actually obtain an image, signal SW2 is supplied to the CPU 501 (S2007).

The CPU 501 drives the image pickup unit 510 via the ASIC 509, which serves as a pickup controller, so as to perform an exposure sequence, such as moving the lens for adjusting the focus, adjusting the shutter speed, controlling the opening of the aperture, and, as needed, operating the strobo (S2008). The image data provided for the solid pickup device 1040 are temporarily stored in a RAM 503 serving as memory means (S2009).

Thereafter, the CPU 501 drives the display means 511, specifically, the liquid crystal display panel 2014 in FIG. 13, to display the obtained image data (S2010).

The above image pickup processing is repeated.

When a user desires to print images, the mode setting means 517 sets the print mode (S2011). Then, while watching the liquid crystal display panel 2014, the user employs the image forward button 110 and the image return button 109 to search for image data in the memory means 503, and displays desired image data. When the user depresses a print button 2013, print signal PR is transmitted to the CPU 501, which then initiates the printing (S2012).

Initially, at the home position of the recording head 400, a printer controller 515 first performs a reserve discharge in order to perform the printing more effectively, and either removes clogging from the recording head 400 or recovers nozzles that have become dry (S2013).

Next, the printer controller 515 performs, for the image data stored in the memory means 503, the image processing for the printer output, and outputs the obtained image data using a printer engine 516 (S2014).

The sheet 1024a printed by the printer engine 516 is automatically fed to the position where it will be separated from the print roll 1024, and is cut and discharged (S2015).

The processing for the present invention will now be described in more detail.

First, at the camera, images recorded in the CF that are to be printed are selected using the UI (not shown).

The number of sheets to be printed, the path for the image and a file name, all of which constitute the print control information for each selected image, are stored as the overall print information in the work RAM and in the EEPROM 504.

By repeating this process a plurality of times, print control information for multiple images can be stored as the overall print information.

When images are selected, the printing is initiated by depressing a predetermined print button (not shown).

Figure 14:
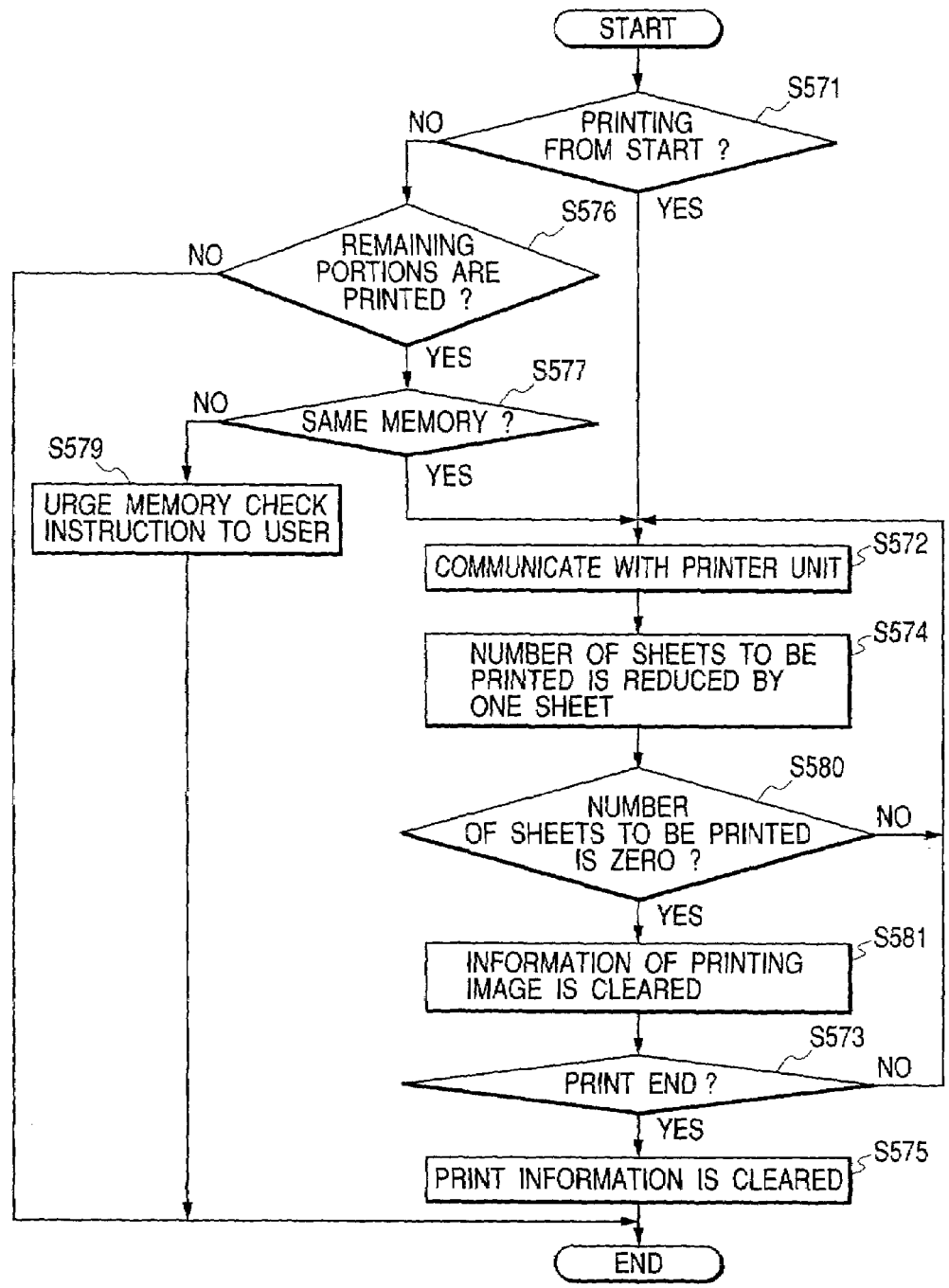
FIG. 14 is a conceptual cross-sectional center view according to the fourth embodiment.

The printing processing will now be described while referring to the flowchart in FIG. 14.

Since the initial printing is performed first, program control is shifted from S571 to S572 for communicating with the printer 1. The camera transmits data to the printer 1, and waits for a print end signal.

When the printing of one sheet has been completed, the process at S574 is initiated to decrement by one the number of sheets to be printed. When the number of sheets remaining to be printed is not zero at S508, program control returns to S572. When the number of sheets is reduced to zero, at S581 the number of sheets to be printed, the path and the file name, all of which are print information for the image currently being printed, are cleared.

A check is performed at S573 to determine, by referring to the overall print information, whether images to be printed still remain. When there are images to be printed, program control is shifted to S572. When there are no more images, at S575 the overall print information is cleared, and the printing processing is thereafter terminated.

When the number of sheets to be printed, the path and the file name, all of which constitute the overall print information for images to be printed, are corrected, the data in the EEPROM 504 is also corrected.

However, when the battery capacity of the camera is reduced during the printing of multiple sheets and the printing can no longer be continued, the battery of the camera must be exchanged and the camera re-activated. After the battery is exchanged, the printer 1 performs a predetermined process, and waits to receive data while remaining in the print enabled state.

At this time, the printing operation is performed again by depressing a predetermined print button.

The processes at S571 and S576 are begun by using a camera UI (not shown) to designate the resumption of printing beginning where it was halted.

At S577 the file information stored in the EEPROM 504 in advance is examined, and when it is ascertained that the same CF is employed, program control is shifted to S572. The number of sheets to be printed, the path and the file name are examined, and then the printing process is begun. This process is repeated until the printing of the designated number of sheets has been completed.

Further, since it is generally known which CF is employed by the user to print image data, the process at S507 may not be required.

In addition, the print information can be written to the flash ROM 502 instead of the EEPROM 504, and as is shown in the second embodiment, a continuous printing process can be initiated when the power is turned on.

The present invention is especially superior for an ink-jet recording head or an ink-jet recording apparatus that includes means for generating thermal energy to be used for ink ejection, and that employs the thermal energy to change the status of ink.

It is preferable that the basic principle disclosed in, for example, U.S. Pat. No. 4,723,129 or U.S. Pat. No. 4,740,796 be employed as a typical configuration and principle. This method is effective for an on-demand type unit. For this reason, at least one drive signal consonant with recording information is applied to an electric heat generator that is located relative to a liquid (ink)-holding sheet and a liquid path, so as to drastically raise the temperature beyond nucleus boiling. Thus, since thermal energy is generated at the electric heat generator, and film boiling occurs on the heat acting face of the recording head, air bubbles can be formed in the liquid (ink) with a one-to-one correspondence to the drive signal. As the air bubble grows or shrinks, at least one droplet is formed by ejecting the liquid (ink) through an orifice. It is preferable that this drive signal have a pulse shape, because the growth and shrinkage of an air bubble is performed immediately and appropriately, and the ejection of liquid (ink) response can be especially superior. An appropriate drive signal having a pulse shape is disclosed in U.S. Pat. Nos. 4,463,359 or 4,345,262. When the condition disclosed in U.S. Pat. No. 4,313,124 for the rate for rise in temperature on the heat acting face is employed, more superior recording can be performed.

In addition to the arrangement of the recording head, disclosed in the above USP specifications, wherein an orifice, a liquid path (a linear or angular liquid path) and an electric heat generator are provided, the structure disclosed in U.S. Pat. No. 4,558,333 or U.S. Pat. No. 4,459,600, wherein a heat acting portion is located in a bending portion, is also included in the present invention.

The present invention is also effective for the structure disclosed in Japanese Patent Application Laid-Open No. 59-123670, wherein a slit used in common is employed as the orifice for each of a plurality of electric heat generators, or the structure disclosed in Japanese Patent Application Laid-Open No. 59-138461, wherein openings into each of which the thermal energy pressure wave is attracted are provided for individual orifices.

A recording head of a full-line type having a length that corresponds to the width of the maximum recording medium on which a recording apparatus can record data, can be either a structure wherein that length is satisfied by a combination of a plurality of recording heads, as disclosed in the above specifications, or a structure integrally formed as a single recording head. With this structure, the present invention can be more effective.

The present invention is also effective for a recording head of replaceable chip type that is loaded into the main body of the apparatus to establish an electric connection with the main body and to permit ink to be supplied from the main body, or for a recording head of cartridge type that is integrally formed with a cartridge. In addition, it is preferable that recovery means and extra auxiliary means for the recording head be provided for the recording apparatus of the invention, because the addition of these means can further stabilize the effects of the invention.

Specifically, for stabilized recording, it is also effective to provide, for the recording head, capping means, cleaning means, pressurization or suction means, and an electric heat generator or another type of heating element or preparatory heating means obtained by combining them, and to prepare a preparatory ejection mode other than a recording ejection mode.

In addition, it is extremely effective for the recording mode of the recording apparatus, not only to record in a main color, such as black, but to also record in full-color, by employing either a plurality of different colors or color mixtures, which can be performed by integrally forming a cartridge with a recording head or by combining multiple cartridges.

As described above, when the printer and the digital still camera are integrally formed and battery-operated, a digital image can be printed any place; however, due to the operation, the battery power tends to be exhausted during the printing and the printing be halted, so that the application of the present invention is preferable.

Especially, since, compared with when only the printer is driven by a battery, the power for image pickup is necessary and considerable power is consumed, the use of this invention is preferable.

Fifth Embodiment

A printing system according to a fifth embodiment of the present invention will now be described in detail while referring to FIGS. 15 to 20.

Figure 15:
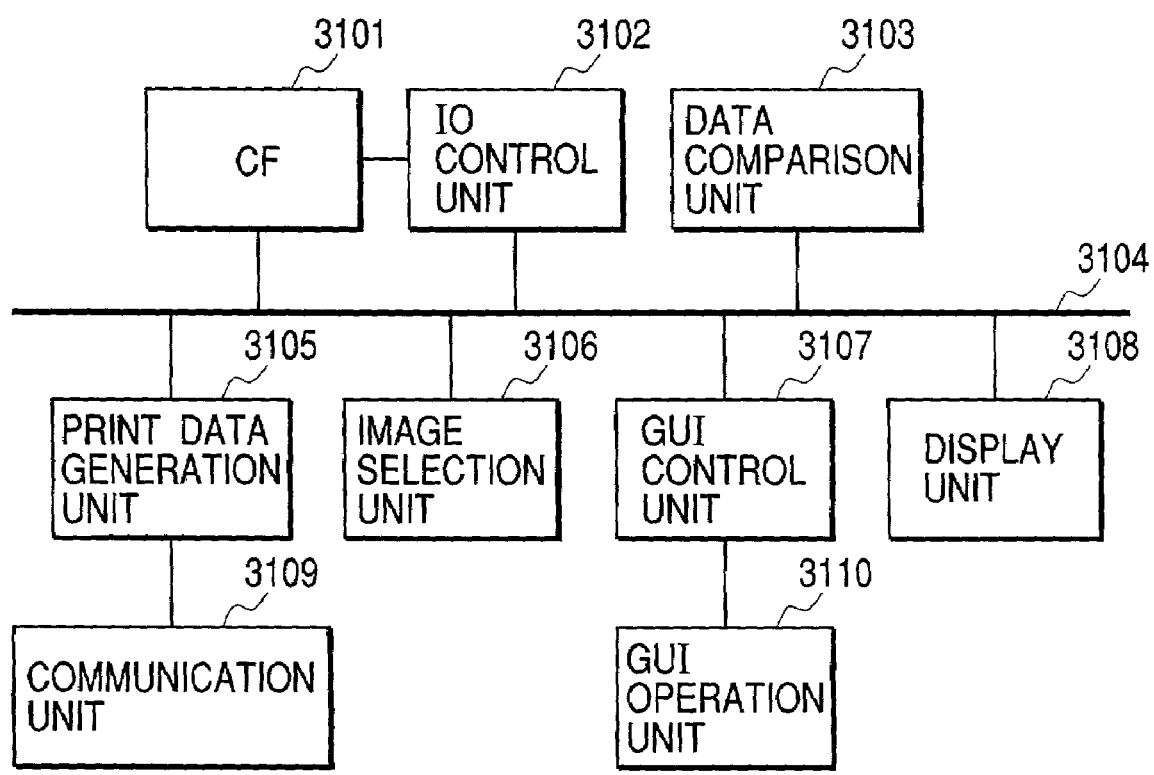
FIG. 15 is a block diagram showing the configuration of a printing system according to a fifth embodiment.

FIG. 15 is a block diagram showing the configuration of the printing system according to this embodiment.

Obtained image data is recorded in a CF 1301. A user performs various operations by manipulating a GUI operation unit 3110, which is connected to a GUI control unit 3107. The GUI control unit 3107 interprets the user's operation in accordance with the state, and transmits a command to the individual sections via a bus 3104 in response to a user's request.

For image printing, the user selects an image to be printed, and designates the number of sheets to be printed. Specifically, the user manipulates the GUI operation unit 3110 to display an image selection screen. At this time, the user's operation is interpreted by the GUI operation unit 3107, which then issues an image display instruction to an image selection unit 3106. The image selection unit 3106 issues an instruction to an IO control unit 3102 to read currently selected image data. The IO control unit 3102 reads the designated image data from the CF 3101, and transmits it to a display unit 3108 via the bus 3104. The received image data is then displayed on the display unit 3108.

While watching images displayed on the display unit 3108, the user selects an image to be printed. To print an image on the display, the user depresses the select button on the GUI operation unit 3110, and sequentially designates the number of sheets to be printed. To select the next image, the user depresses the image forward button of the GUI operation unit 3110 to display the next image, and repeats this process as needed. When the image selection is completed, the user depresses the selection end button on the GUI operation unit 3110. Then, the image selection process is terminated, and the print designation file in FIG. 16, which that includes the file name and the number of sheets for a selected image to be printed, is stored in the CF 3101.

FIG. 16 is a diagram showing a print designation file for the printing system according to the embodiment.

The print designation file is formed of a text character string, so that even a print designation file prepared by a different apparatus can be handled. For the print designation file, one line is defined as extending from the character at the head of a sentence to a line return character, and one line is regarded as one record. A section is formed of multiple records, and the print designation file is formed of multiple sections.

A character string 3201 indicates the start of a header section that is the only one permitted to be present in one print designation file. A date 3202 for creating the print designation file is included in the header section 3201. A character string 3203 indicates the start of a job section. The job section 3203 includes a job ID 3204, a print type 3205, a number 3206 of sheets to be printed and an image file name 3207.

One job section is provided for each image to be printed, and this process is repeated a number of times equivalent to the count of the required job sections.

Figure 19:
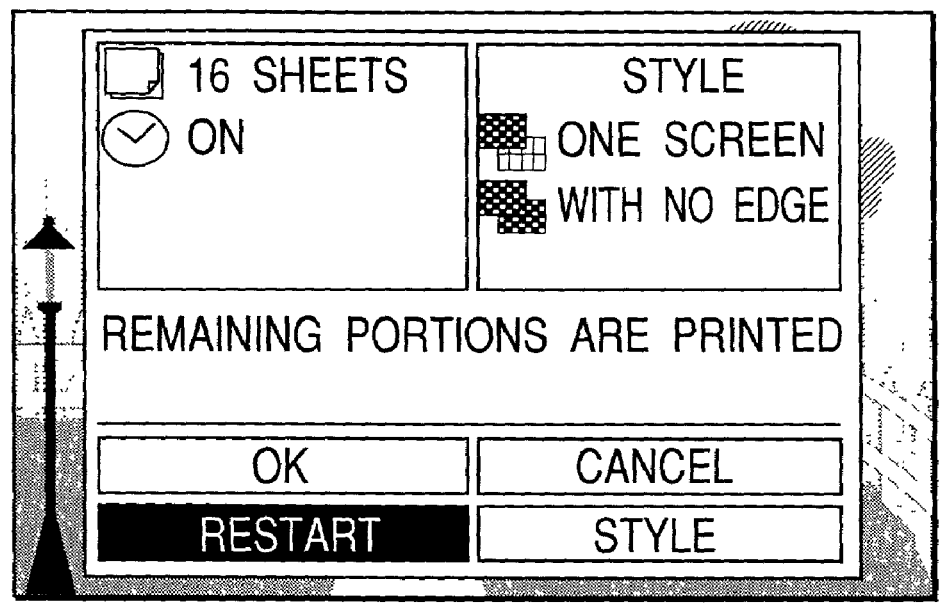
FIG. 19 is a diagram showing a screen for the printing system for the resumption of printing according to the fifth embodiment.

FIG. 19 is a diagram showing a screen for starting or resuming printing.

When the user has set printing, and depresses the print button of the GUI operation unit 3110, the screen in FIG. 19 is displayed on the display unit 3108. When the user selects "OK", by manipulating the cursor key of the GUI operation unit 3110, and depresses the decision button on the GUI operation unit 3110, a print command is issued to the GUI control unit 3107. The image selection unit 3106 reads a print designation file in FIG. 16 from the CF 3101 through the IO control unit 3102. Sequentially, the print designation file is analyzed to obtain the image file name to be designated and the number of sheets to be printed. The image selection unit 3106 reads the designated image file from the CF 3101 through the IO control unit 3102, and transmits, to a print data generation unit 3105, the image file with the number of sheets to be printed. The print data generation unit 3105 generates print data from the received image data, and transmits the print data to a printer through a communication unit 3109. When a plurality of sheets to be printed is designated, the print data generation unit 3105 repetitively transmits the print data the number of times equivalent to the sheet count.

The above processing is performed for all the job sections indicated in the print designation file.

FIG. 17 is a data structure diagram showing the printing status of the printing system according to the embodiment.

One data block is prepared in accordance with a print designation file in FIG. 16, and is stored in the CF 3101 together with the print designation file.

Each of the data 3301 to 3306 has a data length of four bytes. A flag 3301 indicates the validity of the overall data block, and when the flag 3301 is set to "0", the data 3302 to 3306 are regarded as having no meaning. When printing is newly started, however, a value other than 0 is always entered, and when the printing is completed for all the jobs designated in the print designation file, a value of 0 is entered.

The file creation date 3202 of the print designation file in FIG. 16 is stored in an area 3302, and the number of job sections present in the print designation file is stored in an area 3304. The sum of the sheets to be printed is stored in an area 3305 for all the job sections present in the print designation file. The data 3302 to 3305 are updated when the printing is begun while the flag 3301 is set to 0.

The number of sheets that are currently to be printed is stored in the area 3306. When the printing is resumed where it was halted, the number of sheets in the area 3306 indicates a the sheet count beginning with the first sheet of the designated number in the print designation file.

The data 3306 is updated each time a sheet is printed.

Figure 18:
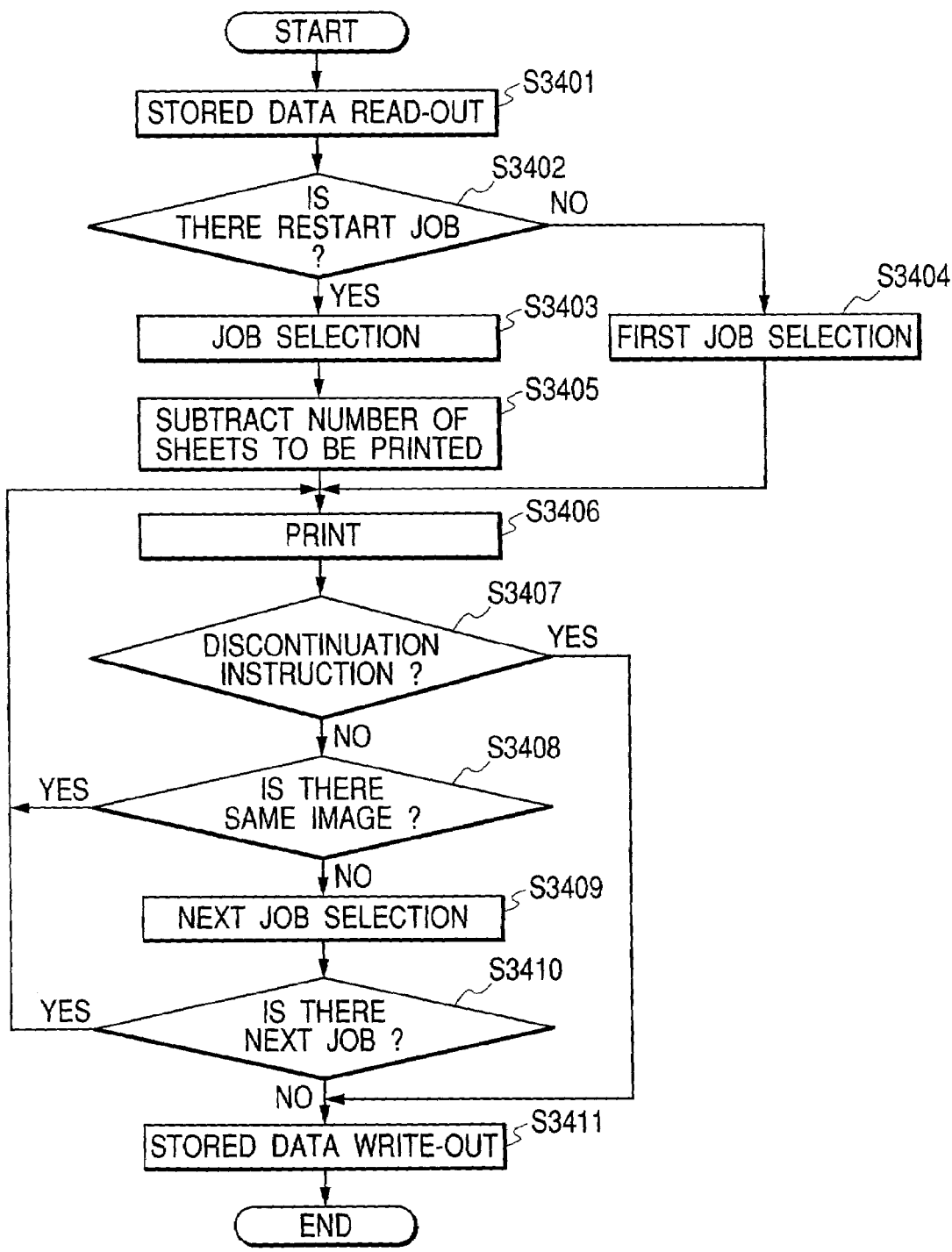
FIG. 18 is a flowchart for the printing resumption processing performed by the printing system according to the fifth embodiment.

FIG. 18 is a flowchart showing the printing resumption processing performed by the printing system according to the embodiment.

At step 3401, the print status data shown in FIG. 17 is read if it is present in the CF 3101. If the print status data is not present, it is newly prepared. In this case, it is assumed that there is no print job to be resumed.

The print designation file is also read, and a check is performed to determine whether an image file designated for each job section is present in the CF 3101. If there is an image file that is not present, the pertinent job section is deleted. In this case, since the file creation date, the number of jobs and the total number of sheets to be printed differ, the presence of a job to be resumed is determined at step 3402.

At step 3402, the authentication of the print status data at step 3401 is examined. When the print status data is not present at step 3401 and new data is newly prepared, it is assumed that there is no job to be resumed. When the print status data is read at step 3401, a data comparator 3103 examines the print status data. In this processing, not only whether the flag 3301 is set to 0 is determined, but also the print designation file is read from the CF 3101, and all the entries in this file, i.e., the creation date, the file size, the number of jobs and the total number of sheets to be printed, are compared with the values stored as the print status data. When even one entry differs, it is assumed that the printing can not be correctly resumed, the obtained print status data is abandoned, the print resumption is not permitted, and only the printing from the beginning is performed. If the printing is re-set up, or the image file to be designated for printing is deleted during a period extended since the printing was interrupted until the printing is resumed, the data different from the stored print status data is detected, so that it is assumed that there is no print job to be resumed.

As a result, even when the operation, such as resetting of the printing or deleting of the file designated to be printed, is performed during a period from the printing is halted until it is resumed, this operation can be flexibly coped with. Since resumption of printing is inhibited when data is changed before and after the interrupt, printing unwanted by the user can be prevented from being illegally performed.

As another method for determining whether the designation for printing is changed while the printing is halted, when new printing is started, a file designated to be printed is copied and is stored in a camera or a printer. When the printing is resumed, the current file is compared with the print designation file that is copied and stored, and the resumption of printing is permitted when the two files are the same. When the number of images to be printed is increased, accordingly the size of the file designated to be printed is increased. Further, the storage area required for copying and storing is also increased, and the processing time for comparing the files is extended. As the necessary storage area is increased, the storage area becomes in short, so that information necessary for printing resumption may not be stored and the printing resumption is disabled. According to the method of the invention, since the amount of information to be stored is constant and the size of the file designated to be printed is small, only a small storage area is necessary, and the data comparison time can be reduced.

When it is ascertained at step 3402 that there is no job to be resumed, a "resume" button in FIG. 19 is not displayed, and the user can not select the resumption of printing.

When it is ascertained at step 3402 that there is a job to be resumed, the "resume" button in FIG. 19 is displayed and the cursor is set to select the "resume". Therefore, the user need only input one entry using a SET button to select the resumption of printing, so that the resumption operation is smoothly performed.

According to this method, not only the operation for resumption can be smoothly performed, but also it is not happened that the printing must be initiated from the beginning because mistakenly the resumption of printing has not been performed. That is, since the operation for selecting "resume" is not required, the occurrence of an erroneous operation, such as selecting "cancel", can be reduced.

When the user selects "resume" by using the GUI operation unit 3110, at step 3403 a job section to be resumed is searched for. Since in the area 3306 the number of sheets is stored that is currently printed by a print job, the job sections in the print designation file in FIG. 16 are examined beginning with the head of the file, and the number of sheets to be printed for each job section is added together. The obtained value is compared with the number of printed sheets stored in the area 3306, and a job section to be resumed is determined.

When the printing is interrupted while the printing is performed for a job section for which the printing was interrupted previously, the number of the printed sheets does not match the total number of sheets to be printed for each job section. In this case, when the total number of sheets to be printed for the individual job sections exceeds the number of printed sheets, the pertinent job section is defined as a current job section. And a difference between the total number of sheets to be printed and the number of printed sheets up to the job section before the pertinent job section is used as the number of sheets to be printed for the current job section. Therefore, at step 3405 the value of this difference is subtracted from the number of sheets to be printed for the current job section, and the number of currently printed sheets is determined for the current job section. At this time, the point where the print job in the print designation file is to be resumed is determined.

When the point for resumption of a print job is determined, at step 3406 the printing is performed. An image file name is read from the current job section, print data is transmitted to the printer, as previously explained in detail while referring to FIGS. 15 and 16, and the printing is performed. When one sheet is printed, at step 3407 a check is performed to determine whether a print interrupt instruction is issued.

Figure 20:
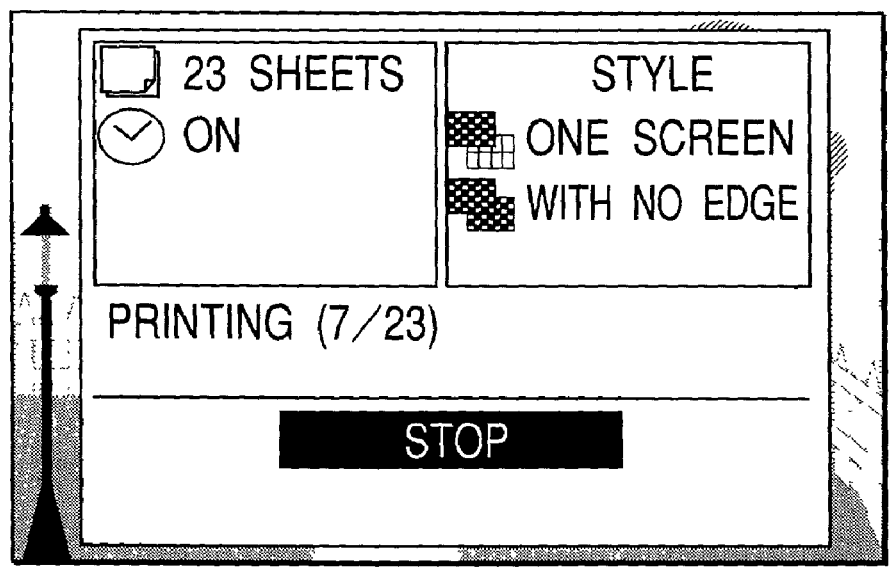
FIG. 20 is a diagram showing a screen for the printing system for the interruption of printing according to the fifth embodiment.

During the printing, a print execution screen shown in FIG. 20 is displayed on the display unit 3108. When the user selects a "stop" button by manipulating the GUI operation unit, and depresses the decision button, the printing can be interrupted.

The printing system issues a print interrupt instruction when the user depresses the print interrupt button by using the GUI operation unit 3110, or when the printing system is driven by the battery, or when it is ascertained that not enough battery capacity remains to continue the printing. Until printing of one sheet is completed, the issuance of a print interrupt instruction is delayed. This is because when the printing is interrupted during printing of one sheet, the printing is incompletely terminated and the sheets and ink are wasted.

When the capacity of the battery is drastically reduced and the printing would be interrupted before printing of one sheet is completed, the pertinent sheet is discharged first so as to prevent the sheet from being held inside the printer when the printing is interrupted.

Especially for a thermal transfer recording printer in the above explanation, since heat sublimation ink or an overcoating layer are pressed against the sheet, when the printing is interrupted, the ink and the sheet may stick to each other and may not be separated. This may cause the failure of the apparatus, and an ink film can not be used any longer.

When it is ascertained at step 3407 that a print interrupt instruction is not issued, the printing is continued. At step 3408, a check is performed to determine whether the printing is performed by the number of sheets to be printed at the current job section, i.e., whether the same image should be further printed. When printing for the same image is not completed, program control returns to step 3406, and the printing is repeated in the above described manner.

When it is ascertained at step 3408 that the printing of the same image has been performed, at step 3409 the next job section is read. In the print designation file in FIG. 16, a job section next to the current job section is regarded as a new current job section. When the new current job section can be read, it is assumed that the next print job is present. And at step 3410 it is determined that the printing should be continued, and program control returns to step 3406 to continue the printing. When a plurality of sheets to be printed is designated for the new current job section, the processes at steps 3406, 3407 and 3408 are repeated by the necessary number of times.

When it is ascertained at step 3410 that there is no next job, at step 3411 the print status data is updated and the updated data is store din the CF 3101. The printing is thereafter terminated. When program control is shifted form step 3410 to step 3411, all the print jobs designated in the print designation file are completed, and the next job to be resumed is not present. Therefore, the flag 3301 for the print status data need only be set to 0 and the other data be defined invalid. In other words, only the flag 3301 need be set to 0, and the other data need not be updated.

When at step 3407 the print interrupt instruction is detected during the printing, the next print job is not performed, and at step 3411 the print status data is updated. At this time, when the number of printed sheets matches the total print count 3305, all the print jobs are completed. Thus, the flag 3301 is set to 0, the other data is not updated, and the print status data is stored in the CF 3101. The printing processing is thereafter terminated.

When all the print jobs are not yet completed, the flag 3301 for the print status data in FIG. 17 is set to other than 0, the number of sheets currently printed is stored in the number of printed sheets 3306, and the print status data is stored in the CF 3101. The printing is thereafter terminated.

When it is ascertained at step 3402 that there is no job to be resumed, at step 3404 the data to be designated for printing in FIG. 16 is read from the beginning, and at step 3406 the printing is begun while the first job section is used as a current job. Then, the same processing as performed when there is a job to be resumed is performed.

The present invention is especially effective when a plurality of jobs are described in the print control information for printing multiple images. This is because, compared with the same image is printed by multiple sheets, the image that is compressed and recorded must be especially expanded by multiple times, and large power is consumed so as to cause the interrupt of printing.

The present invention is not limited to be use for the interrupt of printing due to the exhaust of power, but also can be applied for the interrupt due to the shortage of printing paper or the deterioration of a printing condition, such as dew condensation or heat generation.

Further, in the above embodiments, when the voltage of the battery is lowered, the interrupt information is stored in the RAM of the camera or on the memory card; however, another method may be employed. For example, each time an image is printed on one sheet, the contents that has been completed may be recorded. This is because, since the voltage may be suddenly dropped under the cold weather or with a low the battery capacity, each time an image is printed on one sheet, the contents that has been completed should be recorded so as to securely maintain the interrupt information.

The present invention is especially effective when in the embodiments the camera and the printer are connected by a cable having a power feed line. This is because, since the power feed lines are prepared, the configuration where the battery is excessively consumed by employing the power of one apparatus can be flexibly copied with.

The printer type for which the present invention is applied may be either an ink-jet printer or an electrophotographic laser beam printer.

The present invention may be applied for a system constituted by a plurality of apparatuses (e.g., a host computer, an interface unit, a reader and a printer) or by a single apparatus (e.g., a copier or a facsimile machine).

The scope of the present invention also includes a configuration where, to achieve the functions of the embodiments, software program code that implements the functions of the embodiment is supplied to an apparatus or a system computer that is connected to various devices, and the devices are operated in accordance with a program stored in the computer (a CPU or an MPU) of the system or the apparatus.

In this case, invention functions are provided by the software program code, and the program code or means for supplying the program code to a computer, like a storage medium on which the program code is recorded, constitute the present invention.

The storage medium for supplying the program code can be, for example, a floppy disk, a hard disk, an optical disk, a magneto-optical disk, a CD-ROM, a magnetic tape, a nonvolatile memory card, or a ROM.

In addition, with the present invention it is not only possible for the functions of the previous embodiments to be provided through the execution of program code by a computer, but also, the program code can interact with an OS (Operating System) running on the computer, or with another software application, to provide the functions described in the above embodiments.

Furthermore, with the present invention, program code, read from a storage medium, can be written in a memory that is mounted on a function expansion board inserted into a computer, or in a function expansion unit connected to the computer, and in consonance with instructions in the program code, a CPU mounted on the function expansion board, or in the function expansion unit, can perform part or all of the actual processing required to implement the functions of the above described embodiments.

As is described above, according to the present invention, even when printing for multiple sheets is interrupted, the continuous printing can be performed based on the information stored in the storage means, and only image data that is not yet printed can be selectively printed.

Further, since the information in the storage means is examined when the system is activated, the system can also enter in the continuous print mode.

The present invention is not limited to the above embodiments, and can be variously modified without departing from the scope cited in the claims.

What is claimed is:

1. A printing system, which continuously performs printing on a plurality of sheets based on print setting information including, at the least, information for designating an image to be printed, comprising:
   an input unit adapted to enter image data that are to be printed;
   a printing unit adapted to print said image data entered by said input unit;
   a storage unit adapted to, when printing based on said print setting information is interrupted due to reduction of a battery voltage to a predetermined voltage or lower, store interrupt information concerning the printing completed before the interrupt; and
   a control unit adapted to employ said interrupt information stored in said storage unit to resume printing based on said print setting information.

2. A printing system according to claim 1, wherein said input unit enters image data from an external digital camera.

3. A printing system according to claim 2, wherein said interrupt information is recorded in a non-volatile memory provided for said digital camera.

4. A printing system according to claim 1, wherein said print setting information includes a job for printing a plurality of image types.

5. A printing system according to claim 1, wherein said print means is battery-operated.

6. A printing system according to claim 1, wherein said control unit includes an examining unit adapted to examine whether said print setting information has been changed before and after said interrupt.

7. A printing system according to claim 6, wherein, when said examining unit ascertains that said print setting information has been changed, said control unit does not resume printing based on said interrupt information.

8. A printing system according to claim 1, wherein said interrupt information is updated each time an image is printed on one sheet, and the updated information is recorded in said storage unit.

9. A printing system according to claim 1, which is connected to said digital camera via a connection cable having a power feed line, wherein said printing unit receives power from the power source of said digital camera along said connection cable.

10. A printing system according to claim 1, wherein said control unit includes a determining unit adapted to determine whether said memory card has been replaced before and after said interrupt.

11. A printing system according to claim 10, wherein, when said determining unit determines that said memory card has been replaced, printing is not resumed based on said interrupt information.

12. A printing system according to claim 10, wherein the replacement of said memory card includes a case where information stored on said memory card has been changed.

13. A printing system according to claim 1, wherein, when printing is halted by said printing unit while an image is currently being output on one sheet of recording paper, said recording sheet on which printing is incomplete is discharged.

14. A printing method for continuously performing printing on a plurality of sheets based on print setting information including, at the least, information for designating an image to be printed, comprising:
   an input step of entering image data that are to be printed;
   a printing step of printing said image data entered in said input step;
   a storage step of, when printing based on said print setting information is interrupted due to reduction of a battery voltage to a predetermined voltage or lower, storing interrupt information concerning the printing completed before the interrupt; and
   a control step of employing said interrupt information stored in said storage step to resume printing based on said print setting information.

15. A printing method according to claim 14, wherein, at said input step, image data is entered from an external digital camera.

16. A printing method according to claim 15, wherein said interrupt information is recorded in a non-volatile memory provided for said digital camera.

17. A printing method according to claim 14, wherein said control step includes an examining step of examining whether said print setting information has been changed before and after said interrupt.

18. A printing method according to claim 17, wherein, when it is ascertained in said examining step that said print setting information has been changed, in said control step, printing based on said interrupt information is not resume.

19. A printing method according to claim 14, wherein said control step includes a determining step of determining whether said memory card has been replaced before and after said interrupt.

20. A printing method according to claim 19, wherein, when it is ascertained in said determining step that said memory card has been replaced, printing is not resumed based on said interrupt information.

21. A printing method according to claim 19, wherein the replacement of said memory card includes a case where information stored on said memory card has been changed.

22. A printing method according to claim 14, wherein said print setting information includes a job for printing a plurality of image types.

23. A printing method according to claim 14, wherein said printing step is performed by a battery-operated printer.

24. A printing method according to claim 14, wherein said interrupt information is updated each time an image is printed on one sheet, and the updated information is recorded in said storage step.

25. A digital camera, which continuously performs printing on a plurality of sheets based on print setting information including, at the least, information for designating an image to be printed, comprising:
- an image pickup unit;
- an input unit adapted to enter said print setting information;
- an output unit adapted to output image data to a printer based on said print setting information;
- a first storage unit adapted to store said image data;
- a second storage unit adapted to, when printing based on said print setting information is interrupted due to reduction of a battery voltage to a predetermined voltage or lower, storing interrupt information concerning the printing completed before the interrupt; and
- a control unit adapted to employ said interrupt information stored in said second storage unit to resume printing based on said print setting information.

26. A digital camera according to claim 25, which is battery-operated.

27. A digital camera according to claim 26, with which said printer is integrally formed.

28. A storage medium on which stored is a computer-readable program for continuously performing printing on a plurality of sheets based on print setting information including, at the least, information for designating an image to be printed, said computer-readable program comprising:
- an input step of entering image data that are to be printed;
- a printing step of printing said image data entered in said input step;
- a storage step of, when printing based on said print setting information is interrupted due to reduction of a battery voltage to a predetermined voltage or lower, storing interrupt information concerning the printing completed before the interrupt; and
- a control step of employing said interrupt information stored in said storage step to resume printing based on said print setting information.

29. Computer-executable program instructions stored on a computer-readable storage medium, for causing a computer to execute a printing method for continuously performing printing on a plurality of sheets based on print setting information including, at the least, information for designating an image to be printed, comprising:
- an input step of entering image data that are to be printed;
- a printing step of printing said image data entered in said input step;
- a storage step of, when printing based on said print setting information is interrupted due to reduction of a battery voltage to a predetermined voltage or lower, storing interrupt information concerning the printing completed before the interrupt; and
- a control step of employing said interrupt information stored in said storage step to resume printing based on said print setting information.

30. A print control apparatus, for controlling a printer in order to continuously output an image on a plurality of sheets based on print setting information including, at the least, information for designating an image to be printed, comprising:
- an output unit adapted to output image data to a printer based on said print setting information;
- a storage control unit adapted to, when printing based on said print setting information is interrupted due to reduction of a battery voltage to a predetermined voltage or lower, store, in a memory, interrupt information concerning the printing completed before the interrupt; and
- a control unit adapted to employ said interrupt information stored by said storage control unit to resume printing based on said print setting information.

31. A printing method according to claim 14, wherein, when printing is halted in said printing step while an image is currently being output on one sheet of recording paper, said recording sheet on which printing is incomplete is discharged.

* * * * *

UNITED STATES PATENT AND TRADEMARK OFFICE
CERTIFICATE OF CORRECTION

PATENT NO. : 7,310,156 B2
APPLICATION NO. : 10/058749
DATED : December 18, 2007
INVENTOR(S) : Watanabe et al.

It is certified that error appears in the above-identified patent and that said Letters Patent is hereby corrected as shown below:

COVER SHEET:
    Foreign Patent Documents,
    "62261470" should read -- 62-261470 --;
    "01069372 A" should read -- 1-69372 A --;
    "04175057" should read -- 4-175057 --;
    "06103005" should read -- 6-103005 --;
    "06139031" should read -- 6-139031 --; and
    "10282856" should read -- 10-282856 --.

COLUMN 1:
    Line 23, "images" should read -- images, --.

COLUMN 2:
    Line 50, "is" should read -- are --.

COLUMN 9:
    Line 16, "waited" should read -- awaited --.

COLUMN 19:
    Line 48, "can not" should read -- cannot --.

COLUMN 21:
    Line 47, "store din" should read -- stored in --.

COLUMN 22:
    Line 14, "use" should read -- used --.

UNITED STATES PATENT AND TRADEMARK OFFICE
CERTIFICATE OF CORRECTION

PATENT NO. : 7,310,156 B2
APPLICATION NO. : 10/058749
DATED : December 18, 2007
INVENTOR(S) : Watanabe et al.

It is certified that error appears in the above-identified patent and that said Letters Patent is hereby corrected as shown below:

COLUMN 24:
Line 46, "resume." should read -- resumed. --.

COLUMN 25:
Line 21, "claim 26," should read -- claim 25, --.

Signed and Sealed this

Twenty-second Day of July, 2008

JON W. DUDAS
*Director of the United States Patent and Trademark Office*